(12) United States Patent
Reichler et al.

(10) Patent No.: US 7,152,004 B2
(45) Date of Patent: Dec. 19, 2006

(54) METHOD AND SYSTEM FOR DETERMINING AND MONITORING DISPENSING POINT FLOW RATES AND PUMP FLOW CAPACITIES USING DISPENSING EVENTS AND TANK LEVEL DATA

(75) Inventors: Donald S. Reichler, West Simsbury, CT (US); Adriano Baglioni, South Windsor, CT (US); Thomas C. Zalenski, Avon, CT (US); Robert P. Hart, East Hampton, CT (US); Richard K. Lucas, Enfield, CT (US)

(73) Assignee: Veeder-Root Company, Simsbury, CT (US)

( * ) Notice: Subject to any disclaimer, the term of this patent is extended or adjusted under 35 U.S.C. 154(b) by 169 days.

(21) Appl. No.: 10/963,429

(22) Filed: Oct. 12, 2004

(65) Prior Publication Data

US 2005/0102112 A1     May 12, 2005

Related U.S. Application Data

(60) Provisional application No. 60/510,796, filed on Oct. 11, 2003.

(51) Int. Cl.
*G01F 17/00*     (2006.01)
(52) U.S. Cl. .......................................... 702/55; 702/45
(58) Field of Classification Search ................ 702/45, 702/55
See application file for complete search history.

(56) References Cited

U.S. PATENT DOCUMENTS

| | | | |
|---|---|---|---|
| 5,170,657 A | 12/1992 | Maresca, Jr. et al. | 73/40.5 |
| 5,375,455 A | 12/1994 | Maresca, Jr. et al. | 73/40.5 |
| 5,415,033 A | 5/1995 | Maresca, Jr. et al. | 73/40.5 |
| 6,352,176 B1 | 3/2002 | Hartsell, Jr. et al. | 222/1 |
| 6,463,389 B1 | 10/2002 | Dickson | 702/35 |
| 6,622,757 B1 | 9/2003 | Hart et al. | 141/7 |
| 6,934,644 B1 * | 8/2005 | Rogers et al. | 702/55 |

FOREIGN PATENT DOCUMENTS

| | | |
|---|---|---|
| EP | 0134990 A1 | 3/1985 |
| EP | 0153035 A1 | 8/1985 |

OTHER PUBLICATIONS

"Data Smoothing" techniques, Vanguard Software Corporation, www.vanguardsw.com/dphelp4/dph00109.htm, Feb. 9, 2005.
*Piping Handbook*, 7th edition, Mohinder L. Nayyar, Chapter B13, "Double Containment Piping System Design," pp. B.569-B.649, 1995.

* cited by examiner

*Primary Examiner*—John Barlow
*Assistant Examiner*—Stephen J. Cherry
(74) *Attorney, Agent, or Firm*—Withrow & Terranova, PLLC

(57) ABSTRACT

A system and method for calculating the flow rate of a dispensing point or flow capacity of a pump and fuel delivery system and determining if the dispensing point or fuel delivery system has a blockage and/or a performance problem if the calculated dispensing point flow rate is other than expected. The calculated dispensing flow rate is calculated by collecting fuel tank level data points for a dispensing point that fall within start and stop events of the dispensing event. The slope of a fitted line to the fuel tank level data points is used as the indication of the flow rate of the dispensing point. Different mathematical techniques may be used to improve the flow rate calculation to compensate for the minimum resolution of collecting fuel tank level data and the dead time included in the data of a dispensing transaction.

82 Claims, 14 Drawing Sheets

METHOD AND SYSTEM FOR DETERMINING AND MONITORING DISPENSING POINT FLOW RATES AND PUMP FLOW CAPACITIES USING DISPENSING EVENTS AND TANK LEVEL DATA

RELATED APPLICATION

This patent application claims priority to U.S. Provisional Patent Application No. 60/510,796 entitled, "Method and system for determining and monitoring dispensing point and pump flow rates using tank level data," filed on Oct. 11, 2003 and incorporated herein by reference in its entirety.

FIELD OF THE INVENTION

The present invention relates to a system and method for determining the flow rate of a dispensing point for a fuel dispenser and pump capacities using tank level data in a service station environment to determine if a dispensing point contains a blockage and/or performance problem.

BACKGROUND OF THE INVENTION

Service stations are comprised of a plurality of fuel dispensers that dispense fuel to motor vehicles. A conventional exemplary fueling environment 10 is illustrated in FIGS. 1 and 2. Such a fueling environment 10 may comprise a central building 12, a car wash 14, and a plurality of fueling islands 16.

The central building 12 need not be centrally located within the fueling environment 10, but rather is the focus of the fueling environment 10, and may house a convenience store 18 and/or a quick serve restaurant (QSR) 20 therein. Both the convenience store 18 and the quick serve restaurant 20 may include a point-of-sale 22, 24, respectively. The central building 12 may further house a site controller (SC) 26, which in an exemplary embodiment may be the G-SITE® sold by Gilbarco Inc. of Greensboro, N.C. The site controller 26 may control the authorization of dispensing events and other conventional activities as is well understood. The site controller 26 may be incorporated into a point-of-sale, such as point of sale 22, if needed or desired. Further, the site controller 26 may have an off-site communication link 38 allowing communication with a remote location for credit/debit card authorization, content provision, reporting purposes or the like, as needed or desired. The off-site communication link 38 may be routed through the Public Switched Telephone Network (PSTN), the Internet, both, or the like, as needed or desired.

The car wash 14 may have a point-of-sale 30 associated therewith that communicates with the site controller 26 for inventory and/or sales purposes. The car wash 14 alternatively may be a stand-alone unit. Note that the car wash 14, the convenience store 18, and the quick serve restaurant 20 are all optional and need not be present in a given fueling environment.

The fueling islands 16 may have one or more fuel dispensers 32 positioned thereon. Each fuel dispenser 32 may have one or more fuel dispensing points. The term "dispensing point" can be used interchangeably with fuel dispenser 32 for the purposes of this application. A dispensing point 32 is delivery point for fuel. The fuel dispensers 32 may be, for example, the ECLIPSE® or ENCORE® sold by Gilbarco Inc. of Greensboro, N.C. The fuel dispensers 32 are in electronic communication with the site controller 26 through a wired or wireless connection, such as a LAN or the like.

The fueling environment 10 also has one or more underground storage tanks 34 adapted to hold fuel therein. As such, the underground storage tank 34 may be a double-walled tank. Further, each underground storage tank 34 may include a liquid level sensor or other sensor 35 positioned therein. The sensors 35 may report to a tank monitor (TM) 36 associated therewith. The tank monitor 36 may communicate with the fuel dispensers 32 (either through the site controller 26 or directly, as needed or desired) to determine amounts of fuel dispensed, and compare fuel dispensed to current levels of fuel within the underground storage tanks 34 to determine if the underground storage tanks 34 are leaking. In a typical installation, the tank monitor 36 is also positioned in the central building 12, and may be proximate the site controller 26.

The tank monitor 36 may communicate with the site controller 26 via a wired or wireless connection, and further may have an off-site communication link 38 for leak detection reporting, inventory reporting, or the like, which may take the form of a PSTN, the Internet, both, or the like. As used herein, the tank monitor 36 and the site controller 26 are site communicators to the extent that they allow off-site communication and report site data to a remote location. The site controller 26 and the tank monitor 36 are typically two separate devices in a service station environment.

In addition to the various conventional communication links between the elements of the fueling environment 10, there are conventional fluid connections to distribute fuel about the fueling environment as illustrated in FIG. 2. The underground storage tanks 34 may each be associated with a vent 40 that allows over-pressurized tanks to relieve pressure thereby. A pressure valve (not shown) is placed on the outlet side of each vent 40 to open to atmosphere when the underground storage tank 34 reaches a predetermined pressure threshold. Additionally, under-pressurized tanks may draw air in through the vents 40. In an exemplary embodiment, two underground storage tanks 34 exist—one a low octane tank (87 grade for example) and one a high octane tank (93 grade for example). Blending may be performed within the fuel dispensers 32, as is well understood, to achieve an intermediate grade of fuel. Alternatively, additional underground storage tanks 34 may be provided for diesel and/or an intermediate grade of fuel (not shown).

Pipes 42 connect the underground storage tanks 34 to the fuel dispensers 32. Pipes 42 may be arranged in a main conduit 44 and branch conduit 46 configuration, where the main conduit 44 carries the fuel that is pumped by a fuel pump, such as a submersible turbine pump (not shown) for example, from the underground storage tanks 34 to the branch conduits 46, and the branch conduits 46 connect to the fuel dispensers 32. Typically, the pipes 42 are double-walled pipes comprising an inner conduit and an outer conduit. Fuel flows in the inner conduit to the fuel dispensers, and the outer conduit insulates the environment from leaks in the inner conduit. For a better explanation of such pipes and concerns about how they are connected, reference is made to Chapter B13 of PIPING HANDBOOK, 7th edition, copyright 2000, published by McGraw-Hill, which is hereby incorporated by reference.

As better illustrated in FIG. 3, each fuel dispenser 32 is coupled to a branch conduit 46 to receive fuel from the underground storage tank 34 via the main conduit 44. The fuel dispenser 32 is coupled to a branch conduit 46 that is coupled to the main conduit 44 to receive fuel. As fuel enters into the fuel dispenser 32 via the branch conduit 46, the fuel typically first encounters a shear valve 48. The shear valve 48 is designed to cut off the fuel supply piping 47 internal to the fuel dispenser 32 from the branch conduit 46 in the event that an impact is made on the fuel dispenser 32 for safety reasons. The fuel delivery piping 47 carries the fuel inside the fuel dispenser 32 to its various components before being delivered to a vehicle. As is well known in the fuel dispensing industry, the shear valve 48 is designed to shut off the supply of fuel from the underground storage tank 34 and the branch conduit 46 if the fuel dispenser 32 is impacted to ensure that any damaged internal fuel supply piping 47 due to an impact cannot continue to receive fuel from the branch conduit 46 that may then be leaked to the ground, the customer, and/or the environment.

After the fuel leaves the shear valve 48, the fuel typically passes through a flow control valve 49 located inline to the fuel supply piping 47. The flow control valve 49 may be used to control the flow of fuel into the fuel dispenser 32. The flow control valve 49 may be a two-stage valve so that the fuel dispenser 32 controls the flow of fuel in a slow mode at the beginning of a dispensing event and at the end of the dispensing event (in the case of a prepaid dispensing event), and a fast mode for fueling during steady state after slow flow mode is completed.

After the fuel leaves the flow control valve 49 in the fuel supply piping 47, the fuel may encounter a filter 50 to filter out any contaminants in the fuel before the fuel reaches the flow meter 52 that is typically located on the outlet side of the filter 50. The filter 50 helps to prevent contaminates from passing to the fuel flow meter 52 and the customer's fuel tank. Contaminates can cause a fuel flow meter 52 to malfunction and/or become un-calibrated if the meter 52 is a positive displacement meter, since the contaminate can scrub the internal housing of the meter 52 and increase the volume of the meter 52. If a filter 50 becomes clogged or blocked in any way, either wholly or partially, this will impede the flow of fuel from the fuel dispenser 32 and thereby reduce the maximum throughput/flow rate of the fuel dispenser 32. The maximum throughput of the fuel dispenser 32 is the maximum flow rate at which the fuel dispenser 32 can deliver fuel to a vehicle if no blockages or performance problems exist.

The filter 50 is changed periodically by service personnel during service visits, and is typically replaced at periodic intervals or when a fuel dispenser 32 is noticeably not delivering fuel at a fast enough flow rate. Because the filter 50 is changed in this manner, a fuel dispenser 32 may encounter unusual and unintended low flow rates for a period of time before they are noticed by the station operators and/or before service personnel replace such filters 50 during periodic service visits. There are also other components of a fuel dispenser 32 in addition to the filter 50 that may cause a fuel dispenser 32 to not deliver fuel at the intended flow rate, such as a defective or blocked valve 48, meter 52, hose 58, nozzle 60, or any other component in the fuel supply piping 47 of the fuel dispenser 32.

After the fuel leaves the filter 50, the fuel enters into the fuel flow meter 52 to measure the amount of volumetric flow of fuel. The amount of volumetric flow of fuel is communicated to a controller 54 in the fuel dispenser 32 via a pulse signal line 56 from the fuel flow meter 52. The controller 54 typically transforms the pulses from the pulse signal line 56 into the total number of gallons dispensed and the total dollar amount charged to the customer, which is then typically displayed on LCD displays (not shown) on the fuel dispenser 32 visible to the customer. Note that the flow control valve 49 discussed above may be located on either the inlet or outlet side of the fuel flow meter 52.

After the fuel leaves the fuel flow meter 52, the fuel is delivered to the fuel supply piping 47 on the outlet side of the fuel flow meter 52 where it then reaches a hose 58. The hose 58 is coupled to a nozzle 60. The customer controls the flow of fuel from the hose 58 and nozzle 60 by engaging a nozzle handle (not shown) on the nozzle 60 as is well known.

If there is any blockage, either partially or wholly, in the fuel supply piping 47 within the fuel dispenser 32 or any components located inline to the fuel supply piping 47, the fuel cannot be delivered by the fuel dispenser 32 to a vehicle at the maximum throughput or flow rate that the fuel dispenser 32 would be capable of performing if no blockage existed. A blockage in the fuel supply piping 47 can occur within the piping 47 itself or as a result of a blockage in any of the components that are located inline to the fuel supply piping 47, including but not limited to the shear valve 48, the flow control valve 49, the filter 50, the fuel flow meter 52, the hose 58, and the nozzle 60. Also, if the submersible turbine pump (not shown) that pumps fuel from the underground storage tank 34 to the fuel dispensers 32 is suffering from reduced performance and/or pumping rate, this may result in fuel dispensers 32 not delivering the maximum throughput or flow rate of fuel.

Any decline in the submersible turbine pump performance, a blockage in the fuel supply piping 47, or a blockage in components located inline to the fuel supply piping 47 may cause the fuel dispenser 32 to either not deliver fuel at all or at a reduced rate, thereby reducing the throughput efficiency of the fuel dispenser 32 and possibly requiring a customer to spend more time refueling a vehicle. The customer may be frustrated and therefore not visit the same service station for his or her fueling needs. The reduced throughput of the fuel dispenser 32 may also cause other customers to wait longer for a fueling position thereby resulting in lost revenue in terms of lost opportunity revenues. If the fuel dispenser 32 throughput efficiency can be measured and then compared against a normal throughput in an automated manner, fuel dispenser 32 throughput problems can be detected shortly after their occurrence to allow a station operator and/or service personnel to remedy the problem more quickly.

If a number of motorists dispense fuel simultaneously, the performance of the pump (not pictured) or fuel supply piping 47 may not be sufficient to deliver fuel to the fuel dispenser 32 at all or may cause fuel to be delivered at a reduced rate and possibly require a customer to spend more time refueling a vehicle. The customer may be frustrated and therefore not visit the same service station for his or her fueling needs. The reduced throughput of the fuel dispenser 32 may also cause other customers to wait longer for a fueling position thereby resulting in lost revenue in terms of lost opportunity revenues. If the fuel dispenser 32 flow rate for isolated dispenses (where no other dispensing is taking place at the same time) can be measured and then compared against flow rates for simultaneous dispenses, insufficient pump capacity can be determined or fuel supply piping 47 problems can be detected shortly after their occurrence to allow a station operator and/or service personnel to repair or upgrade their pump or remedy the problem more quickly.

When the flow rate is calculated at a fuel dispenser 32, a reduced flow rate may be caused by a blockage in the fuel supply piping 47, a problem in performance with a fuel pump, or simply human behavior of a motorist dispensing fuel slowly. Only if the tank monitor 36, site controller 26, and/or other control system determines whether there are other dispenses which occurred at the same time can it determine whether the flow rate was affected by the other dispenses.

Until the present invention, one method known for monitoring the throughput efficiency of a fuel dispenser 32 is to measure the flow rate of the fuel dispenser 32. The flow rate is the amount of fuel delivered by the fuel dispenser 32, as measured by the fuel flow meter 52, over the period of time that the dispending event was active. For example, if a fuel dispenser 32 delivers ten gallons of fuel to a vehicle in a two minute dispensing event, the flow rate of the fuel dispenser 32 is five gallons per minute. The fuel dispenser 32 may determine the flow rate by dividing the volume of fuel dispensed, as measured by the fuel flow meter 52, by time, or the flow rate may be determined manually by dividing the volume of fuel delivered as indicated by the fuel dispenser 32 volume display by time. However, with these techniques, several issues can occur which will inaccurately reduce the measured flow rate from the true maximum flow rate capability of the fuel dispenser 32. For example, the nozzle may not be fully engaged during the entire dispensing event thereby reducing the volume throughput and also the calculated flow rate. If the fuel dispenser 32 were to start a timer when performing a flow rate calculation based on the activation and deactivation of the fuel dispenser 32, the timer may start before fuel flow begins thereby causing the time factor in the flow rate calculation to include what is known as "dead time."

FIG. 4 illustrates an example of a typical dispensing event at a fuel dispenser 32 showing volume of fuel dispensed versus time to illustrate the concept of "dead time." At the beginning of the dispensing event, labeled as "Dispense Start," the customer has initiated a dispensing event at a fuel dispenser 32, but has not yet engaged the nozzle 60 handle. The "Dispense Start" event may be obtained from a status of the dispenser 32 being turned on via a switch or relay present in the dispenser 32 that may be associated with the nozzle 60 handle, or may be a digital event that is generated and/or stored in memory of the dispenser 32 and may be accessed. For the purposes of this description, the dispensing start event may also be known to those in the art as a dispensing transaction start event, and the dispense start event data encompasses any of the aforementioned methods.

The customer may begin a dispensing event by lifting a nozzle 60 holder lift (not shown) on the fuel dispenser 32 or by pressing a button. After the customer begins the dispensing event, the tank monitor 36 and/or site controller 26 receives the "Dispense Start" message that indicates the dispensing event start time and fueling point number or name. After "Dispense Start" and before the nozzle 60 handle is engaged to begin fuel flow, time passes for the dispensing event even though fueling is not yet occurring. Once the customer engages the nozzle 60, fuel flow begins which is labeled as "Flow Start" in FIG. 4. "Flow Start" information is typically not made available to the tank monitor 36 and/or site controller 26. The time between the "Dispense Start" message and "Flow Start" is known as "dead time," where fuel is not flowing even though the dispensing event is active at the fuel dispenser 32. After "Flow Start," fueling occurs and the customer may even discontinue fueling during this period of time on purpose or because of a nozzle 60 snap also causing "dead time" in the middle of a dispensing event, which is not illustrated in FIG. 4. The customer may reduce the rate of fueling by not fully engaging the nozzle 60 handle or a pre-pay dispensing event may cause automatic slow down of the rate at the end of fueling, which are not "dead time" since some fuel is flowing, but these also cause the flow rate of the fuel dispenser 32 to be reduced from its maximum flow rate.

When the customer desires to end the dispensing event, the customer will disengage the nozzle 60 handle, labeled as "Flow End", and then deactivate the fuel dispenser 32. This deactivation causes a "Dispense End" message to be generated. Again, the "Dispense End" event may simply be a status of the dispenser 32 being turned off via a switch or relay present in the dispenser 32 that may be associated with the nozzle 60 handle, or may be a digital event that is generated and/or stored in memory of the dispenser 32 and may be accessed. For the purposes of this description, the dispensing end event may also be known to those in the art as a dispensing transaction end event, and the dispense end event data encompasses any of the aforementioned methods. This message is received by the tank monitor 36, site controller 26, and/or other control system and indicates the ending time of the dispensing event, the fueling point number or name, and the total amount and/or running totalizer amount of fuel dispensed. The time between disengaging the nozzle 60 handle and deactivating the fuel dispenser 32 is also "dead time."

As you can see in FIG. 4, the flow rate of the fuel dispenser 32 as measured using the "Dispense Start" and "Dispense End" messages will be lower than the actual flow rates that occur between "Flow Start" and "Flow End" times due to the dead time and due to any discontinuing or reduced engaging of the nozzle 60 handle by the customer or automatically reduced flow during the dispensing event. Therefore, it is not possible to ensure that a reduced flow rate measured by using the "Dispense Start" and "Dispense End" messages is caused by a blockage in the fuel supply piping 47 or a problem in performance with a fuel pump, rather than such reduced flow rate, as measured, occurring as a result of dead time during a dispensing event by any or all of the aforementioned causes.

Therefore, there exists a need to calculate flow rates of actual dispensing, excluding any dead time and/or time of purposefully reduced dispensing flow rates. There further exists a need to correlate the actual dispensing of multiple fuel dispensers 32 at the same time. These needs are fulfilled by using tank level data and a tank monitor 36, site controller 26, and/or other control system and methods for analyzing the data.

SUMMARY OF THE INVENTION

The present invention relates to a system and method for determining the flow rate of dispensing points and flow capacities of pumps in a service station environment wherein the dead time and periods of reduced flow of the dispensing events used are reduced and/or eliminated. The system and method further correlates the actual dispensing of fuel from multiple dispensing points at the same time.

A control system, which may be a site controller, tank monitor, or other controller, receives the start and stopping events generated when a dispensing event is activated and deactivated, respectfully. The control system monitors the tank level information in the underground storage tanks, via tank probes or tank gauges, and records tank levels at different times immediately before, during and after a dispensing event, called "tank level data points."

The control system next uses various mathematical techniques to analyze the tank level data points and determine a region of interest in the tank level data points that has been determined to minimize and/or eliminate tank level data points that will include dead time or other time when dispensing is not occurring or not occurring at maximum flow rates, such as a top off for example. After the tank level data points are analyzed to determine the region of interest, a fitted line is formed through the remaining tank level data points that most likely represent periods of maximum flow rate. The slope of this line is the calculated dispensing flow rate of the dispensing event on the dispensing point.

Various mathematical techniques may be used to analyze the tank level data points. The tank level data points may be smoothed to define a more narrow region of interest where only tank level data points meeting certain criteria in the region of interest are used to fit a line for determining the slope and flow rate. The tank level data points may also be filtered to reduce issues relating to outlying tank level data points. Various techniques may be used to reduce the effect of outlying points and achieve a more accurate flow rate calculation, including but not limited to the well known techniques of least square fit, weighted least square fit, and resistant fit.

Multiple dispensing event calculated dispensing flow rate results for each dispensing point may be further analyzed using weighted averaging or other statistical means to find a more accurate estimation of true maximum flow rate on each dispensing point.

These techniques may be extended to find maximum aggregate flow rates of multiple concurrent dispensing events on multiple dispensing points. Maximum aggregate flow rates are further analyzed to determine the flow capacity characteristics of each fueling pump in the fueling system under increasing pumping load. These flow capacities can be monitored and analyzed to determine if there is a blockage or performance problem with a particular pump or if the pump is not sufficiently powerful for the motorist throughput at the service station.

If the control system determines that the calculated dispensing flow rate for a dispensing point is less than it should be, this is a result of a blockage and/or performance problem at the fuel dispenser or piping system, since the calculated dispensing flow rate has essentially removed the inclusion of "dead time" from the calculation. In this instance, the control system can generate an alarm, send a message to a site controller and/or tank monitor, notify an operator and/or service personnel, and/or send a message to an off-site system.

The control system may use a number of techniques for determining if the calculated dispensing flow rate of a dispensing point indicates a blockage or performance problem. The control system may compare the calculated dispensing flow rate of a dispensing point to a threshold value stored in memory or calculated in real time according to a formula. The control system may compare the calculated dispensing flow rate of a dispensing point to all other calculated dispensing flow rates for all other dispensing points. The control system may compare the currently calculated dispensing flow rate of a dispensing point to past calculated dispensing flow rate for the dispensing point to determine if an anomaly exists.

Similarly, the control system may compare the calculated flow capacity characteristics of each fueling pump in the fueling system under increasing pumping load to expected load characteristics, to all other pumps in the systems, and to past calculated characteristics on the same pump to determine if an anomaly exists.

Analysis of aggregate flow rates of multiple concurrent dispensing events on multiple dispensing points may also be used to determine if the performance of a fuel tank pump is deteriorating or is failing. Dispensing event periods consisting of multiple concurrent dispensing events on multiple dispensing points are first identified in the stored data by examining the chronological sequence of dispense start and end times for all dispensing points at a dispensing facility. Periods where more than one dispensing point 32 are active are isolated and tank fuel level data points are found between the start and end of each isolated period.

Each period of tank level data points is analyzed to calculate a best fit line to the highest slope portion of the period data points. The slope of the best fit line is an aggregate flow rate for the combined dispensing activity on the multiple active dispensing points. A set of calculated aggregate flow rates may be accumulated and analyzed in two different manners.

First, a set of aggregate flow rates are accumulated and grouped for each active pump by number of active dispensing points supplied by a pump. An average aggregate flow rate is calculated from the individual rates for each dispensing point on a pump using volume weighted averaging method or other statistical means to improve resulting accuracy. An aggregate flow rate sequence that falls off from linear with number of dispensing points' earlier than expected or more so than compared to historical aggregate flow rate performance is an indication of a deteriorating or failing pump.

A set of aggregate flow rates of multiple concurrent dispensing event periods on multiple dispensing points may be combined with singly active dispensing point dispensing event periods and further analyzed to improve the accuracy of the estimated flow rate on a dispensing point or to reduce the time required to accumulate adequate data for an analysis on a dispensing point.

Each single or multiple concurrent active dispensing point dispensing period is categorized by the dispensing number or numbers that are active during the period. The aggregate flow rate and associated dispensing point numbers for a period form one data point. A set of such data points is analyzed using multiple linear regression or other statistical method to calculate a flow rate for each individual dispensing point found in the data set.

Those skilled in the art will appreciate the scope of the present invention and realize additional aspects thereof after reading the following detailed description of the invention in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

Figure 1:
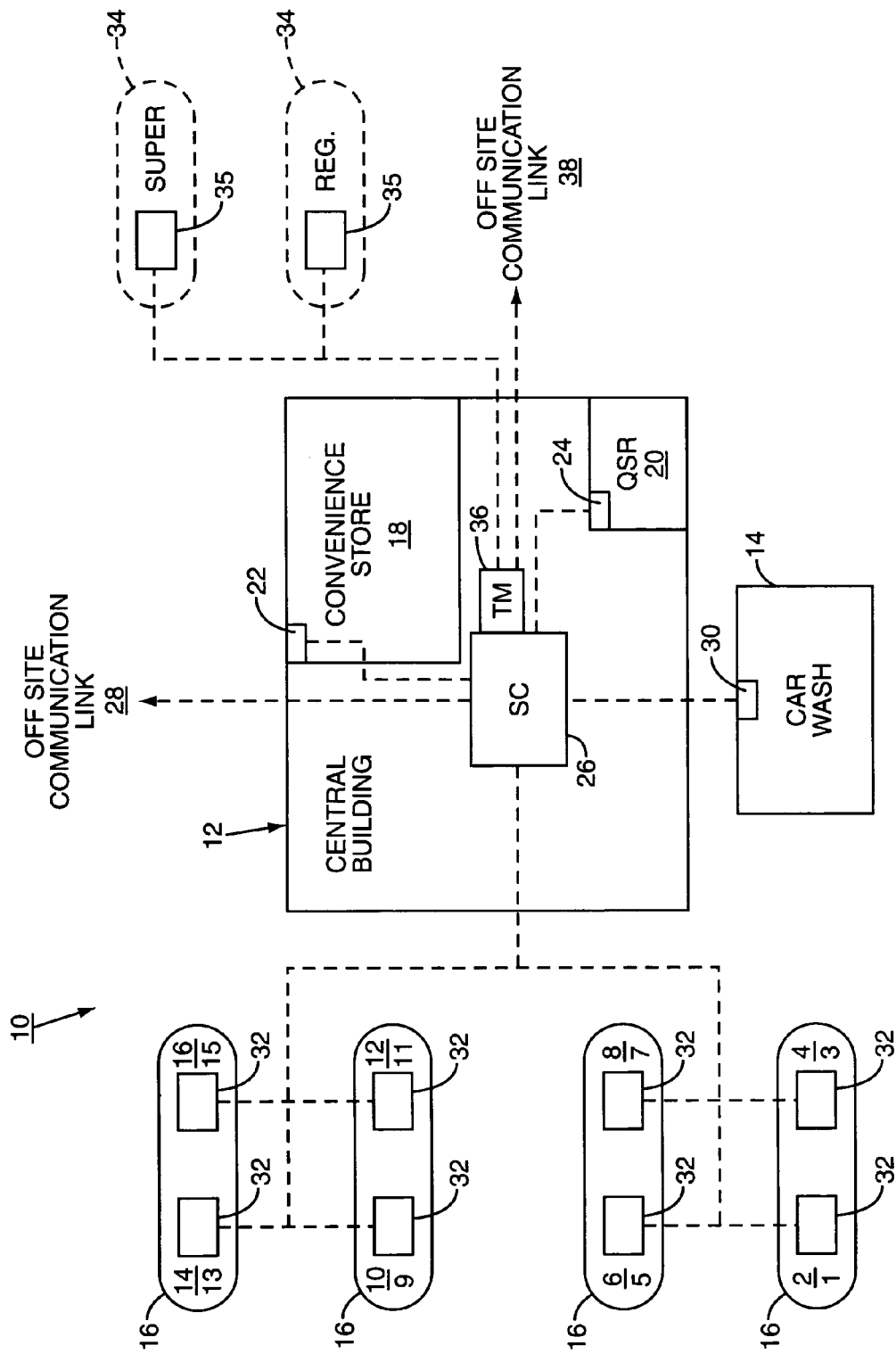
FIG. 1 illustrates a conventional communication system within a fueling environment in the prior art.
Figure 2:
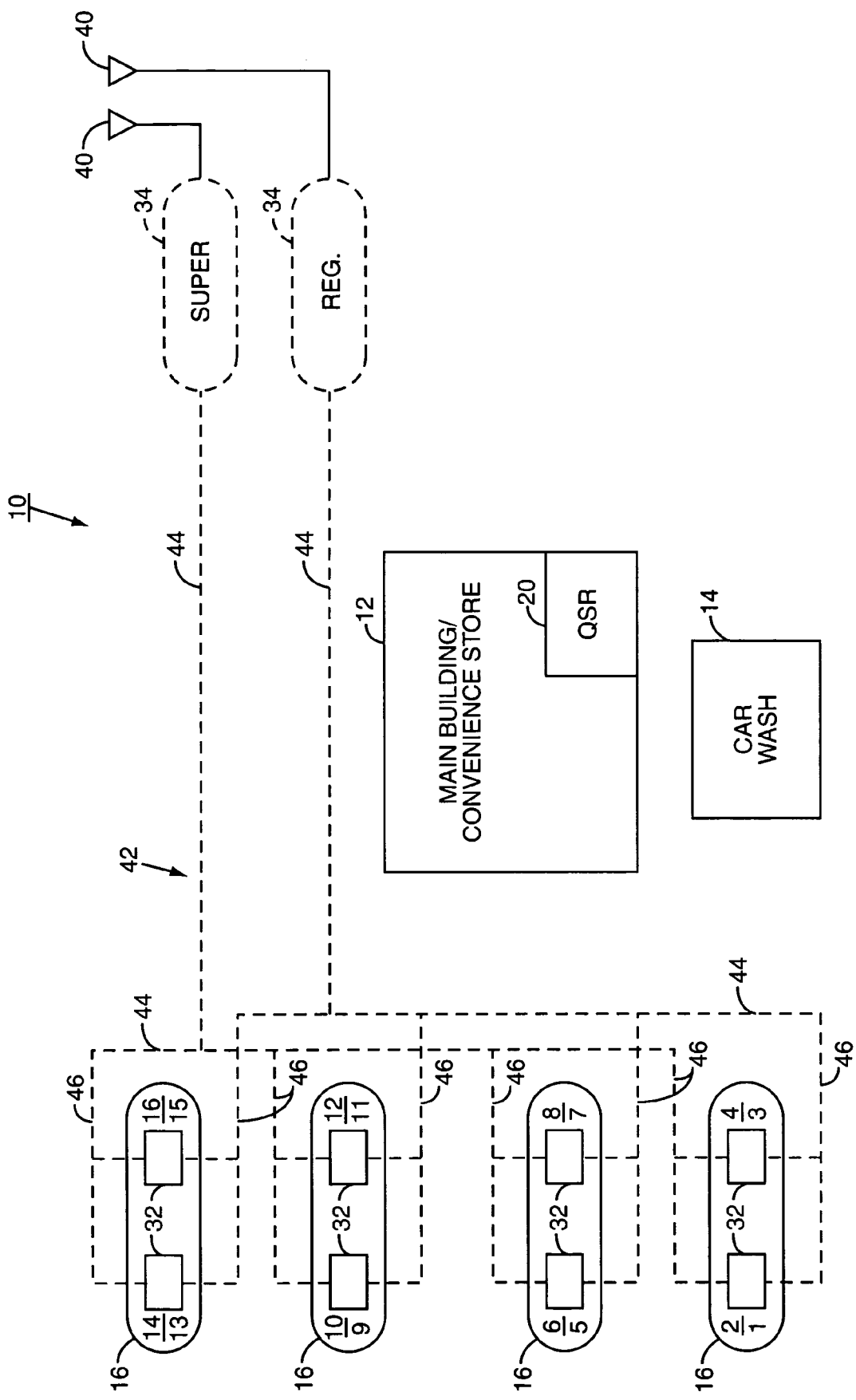
FIG. 2 illustrates a conventional fueling path layout in a fueling environment in the prior art.
Figure 3:
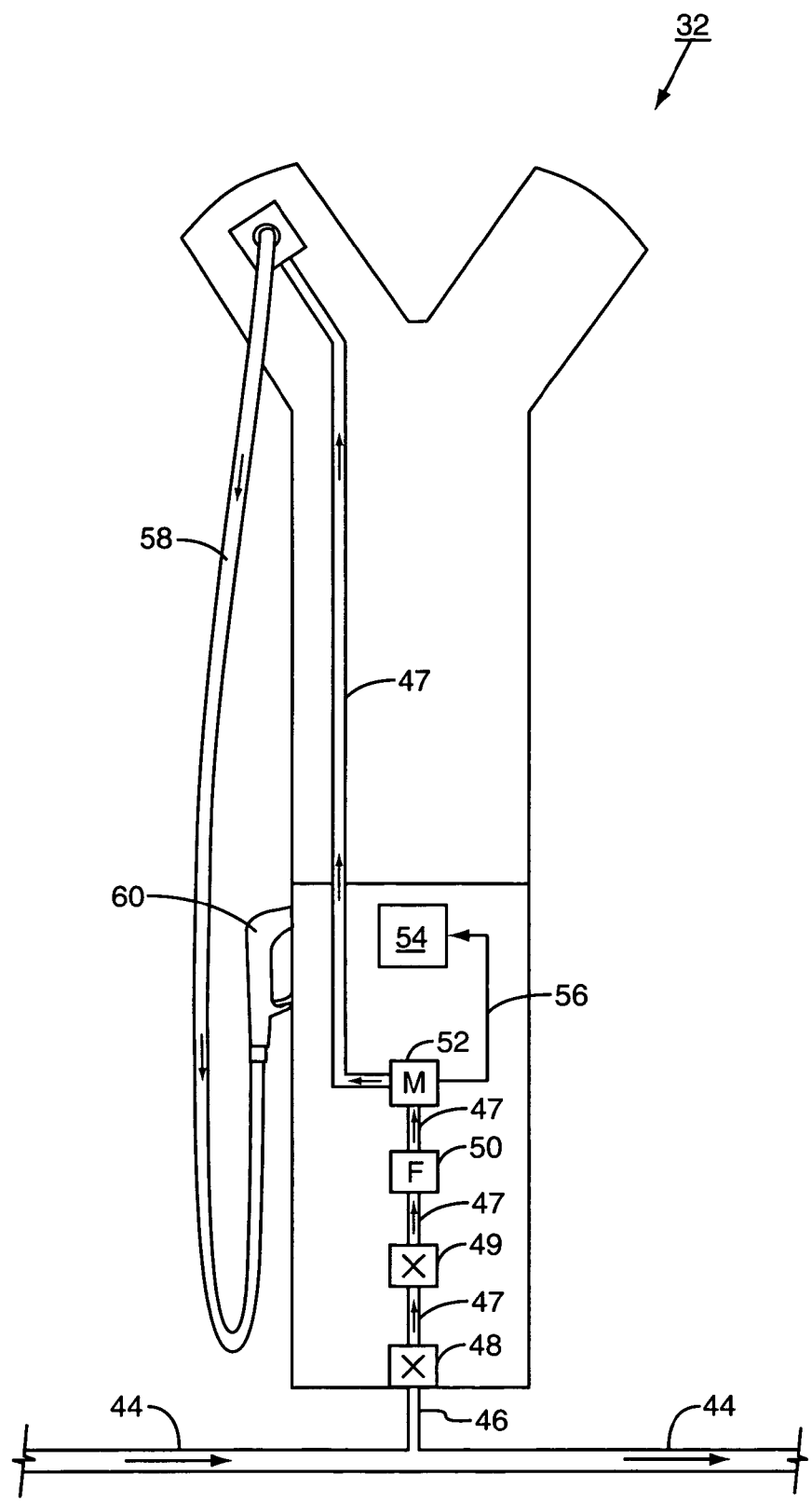
FIG. 3 illustrates, according to an exemplary embodiment of the present invention, a fuel dispenser.
Figure 4:
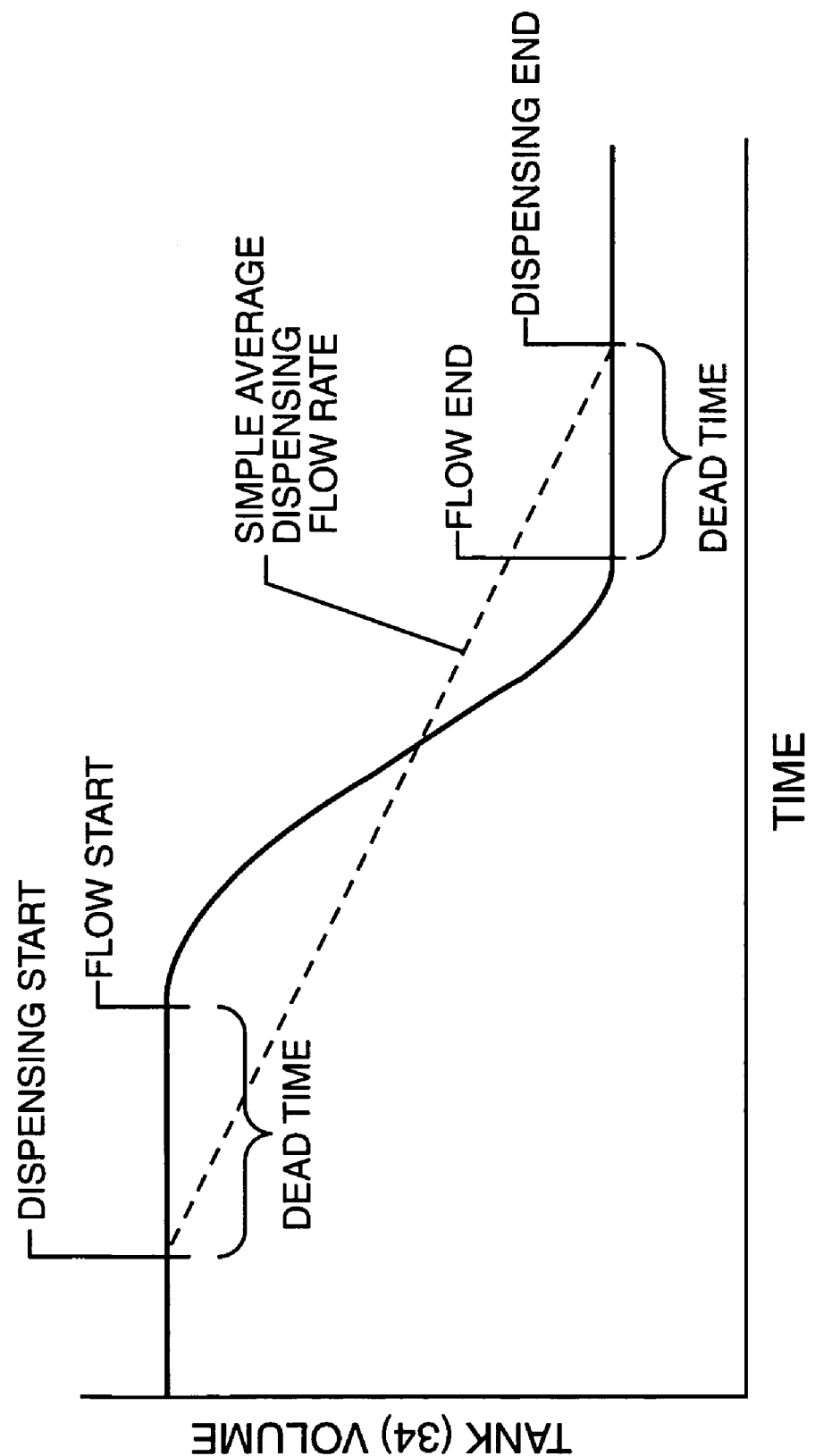
FIG. 4 illustrates a typical dispensing event of volume versus time.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

This patent application claims priority to U.S. Provisional Patent Application No. 60/510,796 entitled, "Method And System For Determining And Monitoring Dispensing Point And Pump Flow Rates Using Tank Level Data," filed on Oct. 11, 2003 and incorporated herein by reference in its entirety.

One solution to this problem is found in co-pending patent application Ser. No. 10/684,258, filed by the assignee of the present application entitled "Method And System For Determining And Monitoring The Dispensing Efficiency Of A Fuel Dispensing Point In A Service Station Environment," filed on Oct. 11, 2003, which is hereby incorporated herein by reference in its entirety. Application Ser. No. 10/684,258 discusses how to determine the maximum dispensing efficiency of a dispensing point using dispense volume information derived from meter data at the dispensing point over time and over a plurality of dispensing events. The dispensing efficiency is determined by finding and analyzing the volume and time pair measurements of dispensing events where dead time is minimized from a plurality of fueling events.

The present application uses fuel tank level data to determine the flow rate of a dispensing point by analyzing fuel tank level information for a fueling event carried out for the dispensing point. Only a single fueling event need be carried out to determine the flow rate of a dispensing point in the present application, as opposed to application Ser. No. 10/684,258, since analyzing the fuel tank level data as opposed to the dispensing point meter data minimizes and/or eliminates the "dead time" in the calculation of flow rate.

Multiple calculated dispensing flow rate results may be further analyzed to improve the accuracy of the result on a dispensing point.

These techniques may be extended to find maximum aggregate flow rates of multiple concurrent dispensing events on multiple dispensing points. Maximum aggregate flow rates are further analyzed to determine the flow capacity characteristics of each fueling pump in the fueling system under increasing pumping load.

After the dispensing flow rate and pump flow capacity characteristics are calculated, the control system has the ability to determine a blockage and/or performance problem in a fuel dispenser 32 or dispensing point and pumping system. The application will refer to fuel dispenser 32 and dispensing point 32 interchangeably hereafter since the determination of the calculated dispensing flow rate is based on the dispensing point 32, of which a fuel dispenser 32 may have one or more.

Figure 5:
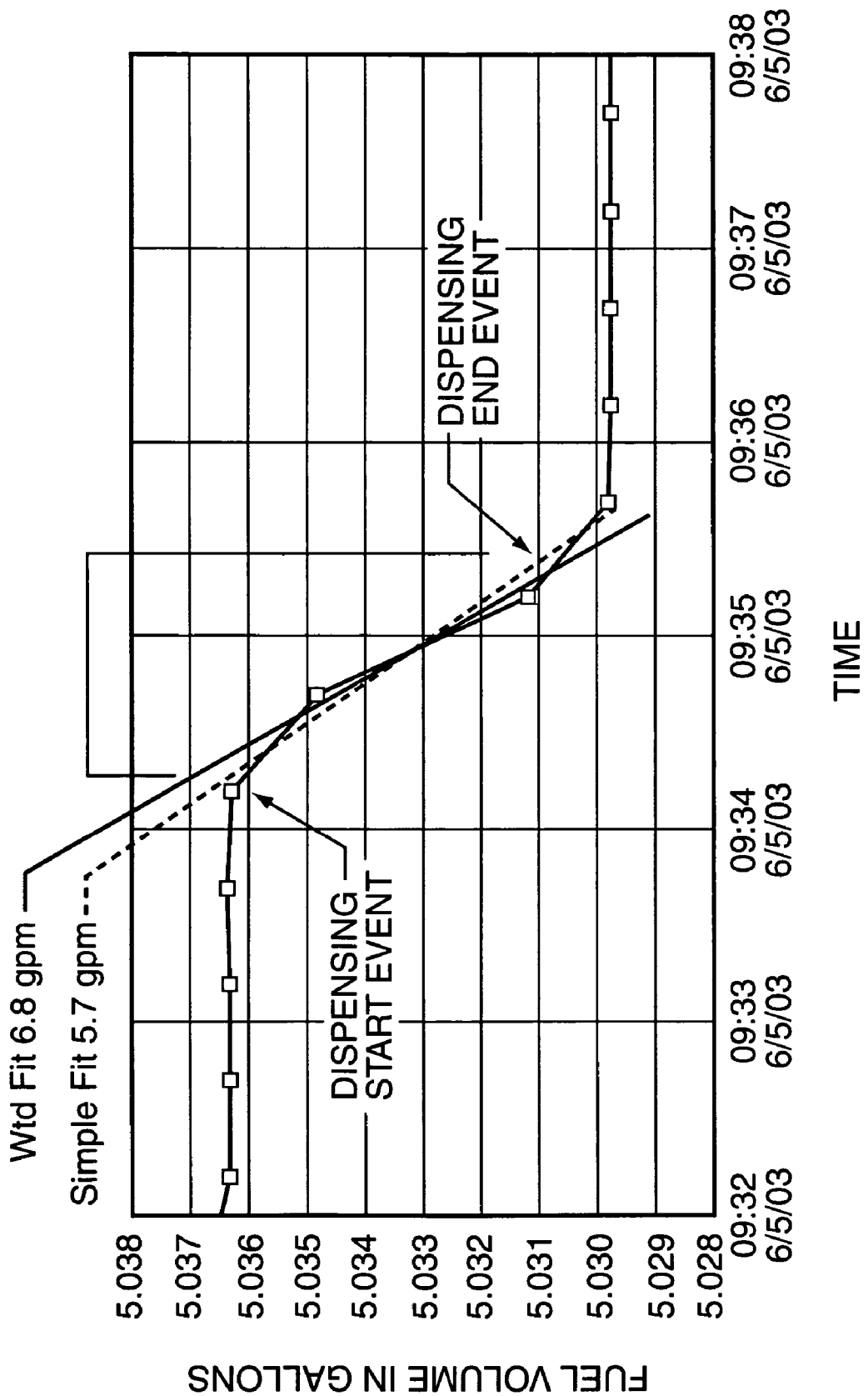
FIG. 5 illustrates one embodiment of determining the calculated dispensing flow rate for a dispensing point using fuel tank level data having a 30 second resolution.
Figure 6:
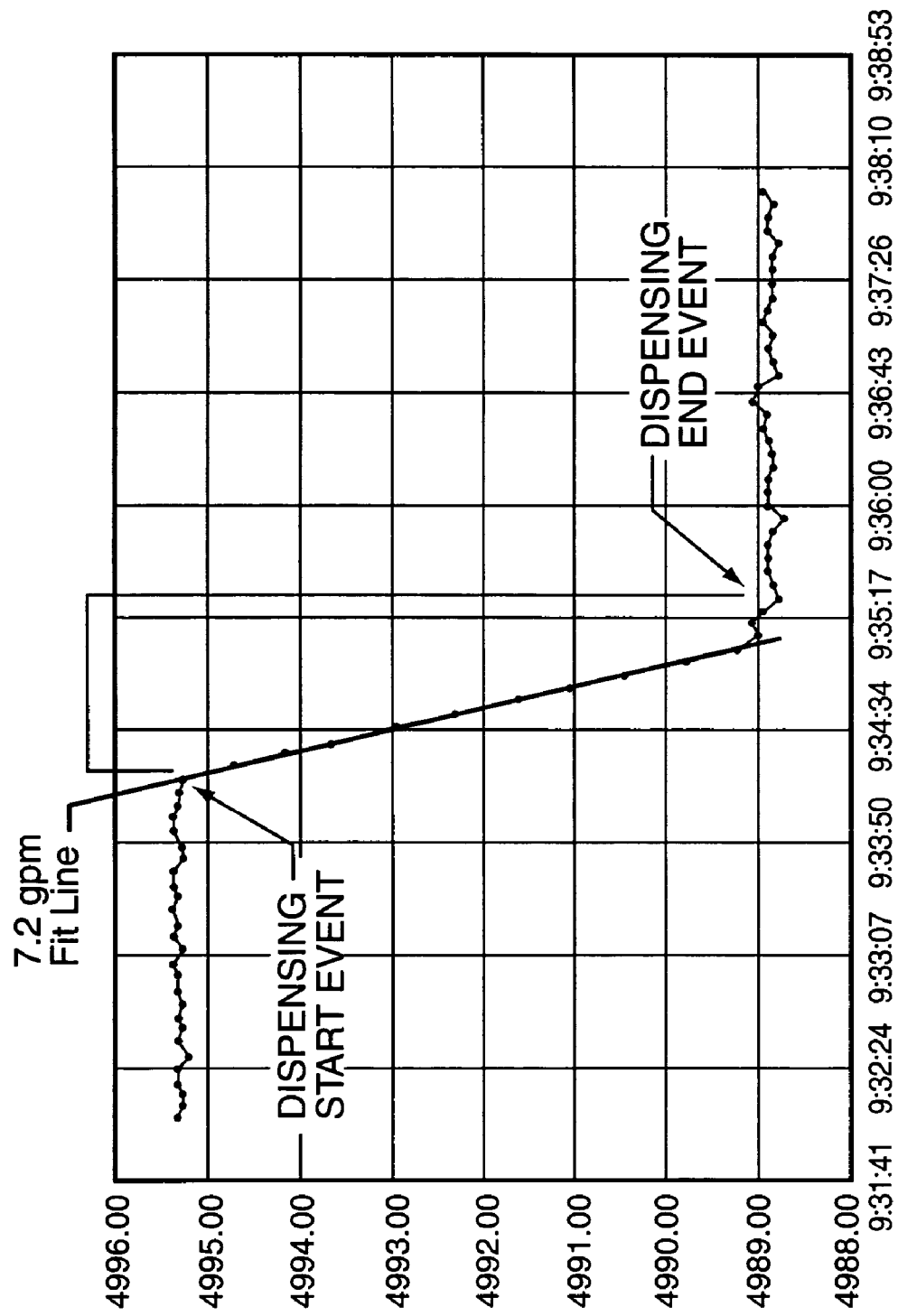
FIG. 6 illustrates the embodiment illustrated in FIG. 5 for determining the calculated dispensing flow rate for a dispensing point using fuel tank level data, except that the fuel tank level data has a 5 second resolution.

FIGS. 5 and 6 illustrate examples of calculating of a dispensing flow rate for a dispensing point 32 using data received from an underground storage tank 34 in accordance with the present invention. The discussion of FIGS. 5 and 6 will be made here in tandem with the flowcharts in FIGS. 7A and 7B. The underground storage tank 34 is fitted with a probe or tank gauge (not shown) that is capable of determining the fuel level inside the tank 34. In the examples illustrated in FIGS. 5 and 6, the y-axis shows the fuel level in the tank 34. The x-axis shows the period of time over which a dispensing event occurred. A tank level data point is illustrated on the graphs in FIGS. 5 and 6 for each fuel tank level reading that is made by the tank probe to indicate the fuel tank level at that time. In FIG. 5, the resolution of the tank probe is 30 seconds meaning that a fuel tank level reading is made every 30 seconds. In FIG. 6, the resolution of the tank probe is 5 seconds.

In the present invention, a control system, which may be a site controller 26, a tank monitor 36, or any other type of control system which has access to the Dispensing Start and Dispensing End events, can perform the present invention. The flowchart in FIGS. 7A and 7B discuss how a control system determines a calculated dispensing flow rate using tank level data from a tank 34 for a dispensing point 32.

To perform all the various types of flow rate calculations and analyses aforementioned, tank level data on all tanks and dispensing event data on all dispensing points are continuously acquired and stored in the controller memory. Post processing is performed to identify isolated or portions of fuel dispensing periods from the dispensing events for the various combinations of single and multiple concurrent dispensing activities. Each isolated or portion of a dispensing period is analyzed in a manner depending upon whether it comprises single dispensing event or multiple concurrent dispensing event activity. Single, isolated dispensing event activity is analyzed as follows in the next sections.

Figure 7A:
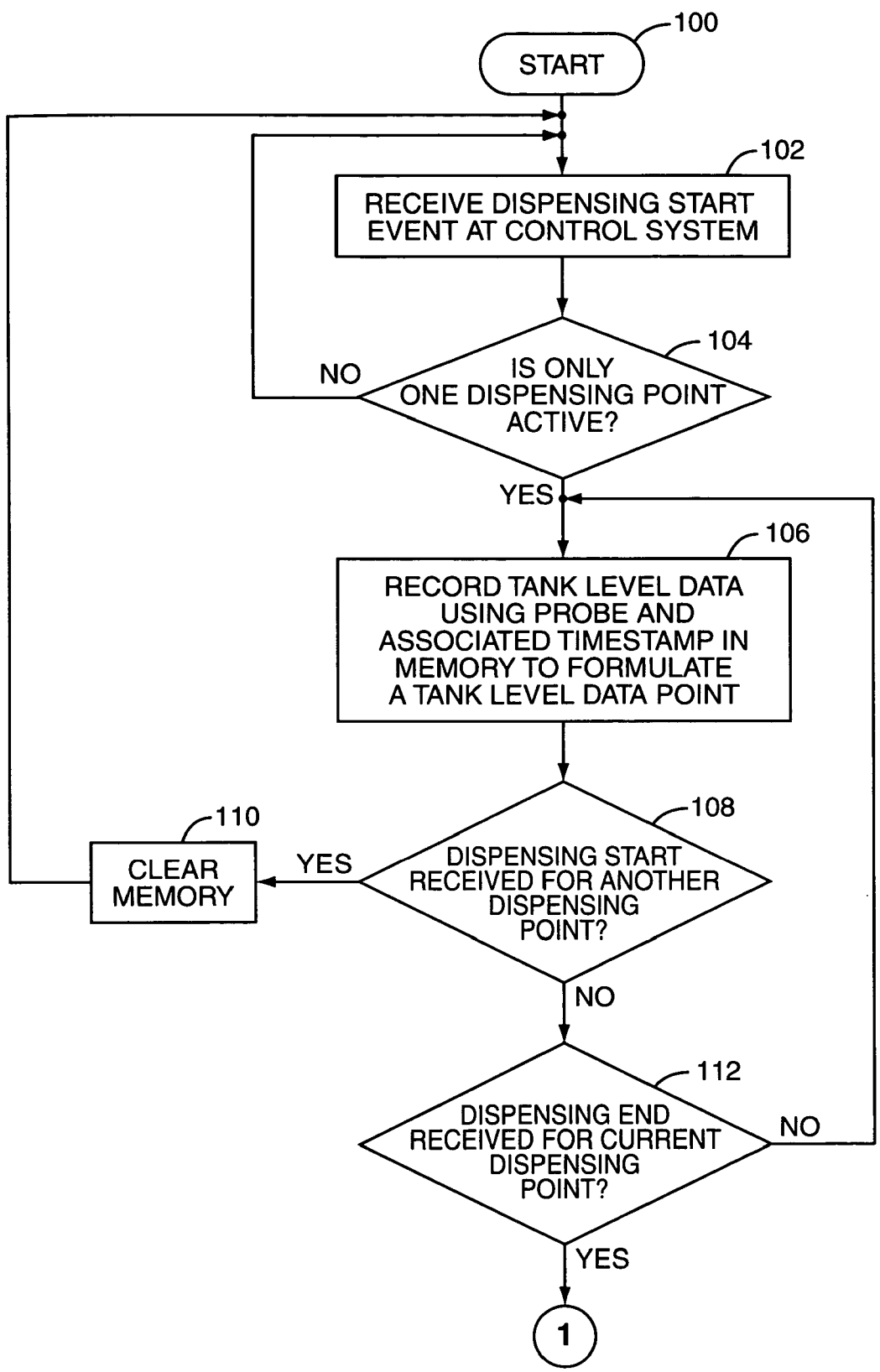
FIGS. 7A and 7B illustrate flow chart diagrams of how the calculated dispensing flow rate is determined for a dispensing point in accordance with the embodiments illustrated in FIGS. 5 and 6.

As illustrated in FIG. 7A, the process starts (block 100), and the control system searches the stored dispensing event data in chronological order and receives a Dispensing Start message indicating that one or more fuel dispensing points 32 have been activated by a customer for dispensing (block 102). A dispensing point 32 cannot dispense fuel in this example until the Dispensing Start message is sent. The control system next determines if only one dispensing point 32 among all dispensing points 32 is active during this period such that it is an isolated dispensing event (decision 104). If more than one dispensing point 32 is active and dispensing fuel, the fuel level in the tank 34 will drop according to the dispensing of the more than one dispensing point 32. These more complex tank level data are not analyzed with these methods, but are analyzed with other methods described in later sections.

If more than one dispensing point 32 is active, the control system will abort performing the rest of the flow chart steps illustrated in FIG. 7A and will return back to block 102. However, if only one dispensing point 32 is active, the control system will record or copy from the monitor 36 the tank level data using the probe and associated timestamp of the data in memory to formulate a tank level data point (block 106). The points located on FIGS. 5 and 6 are examples of tank level data points. If the control system receives a Dispensing Start message for another dispensing point 32 (decision 108) at anytime following the first start time prior to finding an end time for the original dispensing point, the control system will abort the flow rate calculation, clear memory of the data points (block 110) and proceed to wait for another Dispensing Start message in chronological order (block 102).

The control system will next determine if the dispensing event at the dispensing point 32 has finished without any interference from other dispensing point activity by determining if a Dispensing End message was received in the stored data in chronological order before another start time is found on any other dispensing point (decision 112). If not, the control system continues to record more tank level data points for the dispensing event at the dispensing point 32 over time in a continuous fashion during the fueling or dispensing transaction (block 106). If a Dispensing End message is received in decision 112, the dispensing event at the dispensing point 32 is finished, and the control system finds the remainder of continuous tank level data points up to and immediately following the dispense end time. The control system can now analyze the tank level data points found immediately preceding, continuously during, and immediately following the dispensing event to determine the flow rate of the dispensing point 32.

In the above steps, if the dispensing event involves dispensing from more than one tank, due to fuel blend dispensing or multiple manifold-connected tanks, then fuel level data from more than one tank are found and arithmetically summed prior to the following steps. The summed fuel level points represent the total amount of fuel dispensed for the single dispensing event and can thus be treated in the same manner as data from a single tank case.

At this point, the control system has found one or more tank level data points that represent the fuel tank level at different points in time as a result of a dispensing event at a dispensing point 32. One method of determining the flow rate of a dispensing event at a dispending point 32 is to calculate a best fit line for this set of tank level data points and measure the slope of the line since the slope represents the change in volume of fuel over time or duration of dispensing. An example of this calculation method is illustrated in FIG. 5 as the "Simple Fit" line. A "Simple Fit" line uses a line fitting technique, such as the least squares method, to fit the best line to all of the tank level data points. The "Simple Fit" line has a slope of 5.7 gallons per minute (GPM) in the example in FIG. 5. A "Weighted Simple Fit" line, also illustrated in FIG. 6, has a slope of 6.8 GPM. FIG. 6 shows a flow rate of 7.2 GPM using the "Simple Fit" line. The slope of the fitted line, and thus the measured flow rate, is greater in FIG. 6 since the tank probe resolution is 5 seconds as opposed to 30 seconds, yielding a more accurate representation of changes in tank 34 volume. Generally, the finer the resolution of the tank probe, the higher the calculated dispensing flow rate will be since the tank level data points will include less dead time.

The "Simple Fit" line fitting technique to determine a calculated dispensing flow rate is not the most accurate method of determining a flow rate for a dispensing point 32. Using a "Simple Fit" line with all of the tank level data points will tend to reduce the calculated dispensing flow rate of the dispensing point 32 since it may include "dead time," as previously discussed above. For example, if the first tank level data point was recorded after a Dispensing Start message was received, but before dispensing actually began, this will introduce dead time into the calculation. Therefore, the present invention uses various techniques and methods on the tank level data points to determine a more accurate flow rate of a dispensing event to reduce and/or eliminate the "dead time" from the tank level data points.

Figure 7B:
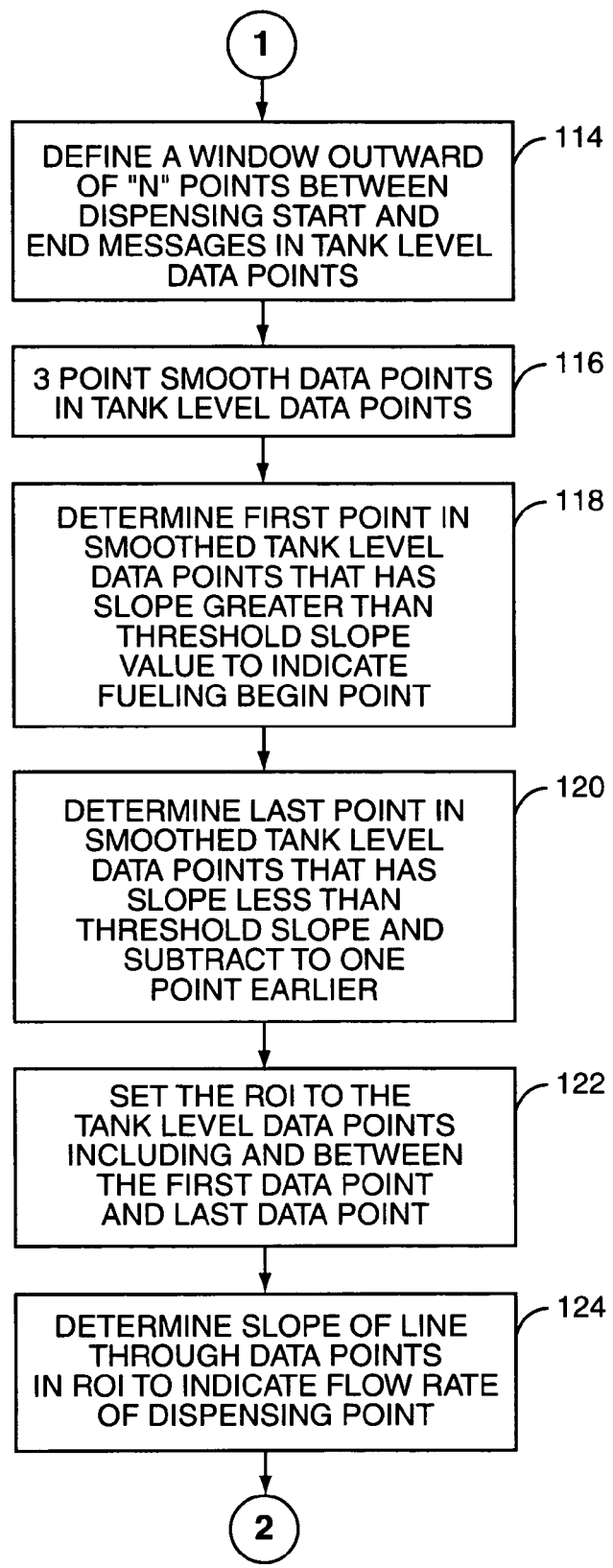

FIG. 7B illustrates one embodiment of how the present invention determines a calculated dispensing flow rate for a dispensing point 32 using the tank level data points found in stored data for a dispensing event by a control system. First, the control system defines a window of all the tank level data points that were found between the Dispensing Start message and the Dispensing End message (block 114). These are the tank level data points that were found when a single dispensing point 32 conducted a fueling/dispensing transaction. Next, the control system smoothes either the tank level data points or a copy of the tank level data points using a three point smoothing technique to exaggerate the transition tank level data points at the start and end of where the slope begins to increase due to dispensing of fuel at the dispensing point (block 116). A copy of the tank level data points may be used so that the original tank level data points are left intact for tank reconciliation and other purposes. For the purposes of this specification and defining the present invention, the operations discussed as being performed on the tank level data points encompasses performing such operations on either the original or a copy of the tank level data points. Data smoothing and different techniques of data smoothing are well known to those of ordinary skill in the art. For examples of data smoothing techniques, see http://www-.vanguardsw.com/dphelp4/dph00109.htm herein incorporated by reference in its entirety. The smoothed tank level data points are stored in memory.

The control system next determines the first point from the smoothed tank level data points where the slope begins to increase to greater than a threshold slope value stored in memory (block 118). This defines the point at which dispensing of fuel at the dispensing point 32 began in case some of the earlier tank level data points were recorded by the control system before fuel began dispensing at the dispensing point 32. This point is called a first data point. This helps to eliminate dead time that may be present in the beginning of the tank level data points. Next, the control system determines the last tank level data point in the smoothed tank level data points where the slope begins to decrease to less than a threshold slope value stored in memory. The control system then subtracts one tank level data point from this point to define an ending point from the smoothed tank level data points (block 120). This point is called a last data point. This helps to eliminate dead time that may be present at the end of the tank level data points if dispensing stopped before the dispensing event was completed and the Dispensing End message was received.

Next, the control system determines what is known as a region of interest (ROI) from the original (not smoothed) tank level data points which will be analyzed to determine the flow rate of a dispensing event at the dispensing point 32

(block 122). The ROI is a region of the original tank level data points that has been determined to minimize and/or eliminate tank level data points that will include dead time or other time when dispensing is not occurring or not occurring at maximum flow rates, such as a top off for example. The ROI may be calculated in any manner in accordance with the present invention in which tank level data points that are created as a result of a dispensing transaction are analyzed to select only those tank level data points that are more likely not to include dead time or having minimal dead time so that the flow rate calculation is more accurate as previously described.

In the current example, the ROI is between the first data point and last data point previously determined by the control system in blocks 118 and 120. Lastly, the control system calculates the slope of a best fit line for the original tank level data points in the ROI and uses the slope as the calculated dispensing flow rate of the dispensing point 32 for the dispensing event (block 124), and the process ends (block 125). Because the ROI from which the tank level data points was more narrowly defined to include data points where dispensing was actually occurring and less dead time, this results in a higher and more accurately calculated dispensing flow rate of a dispensing point 32.

In an alternative embodiment, the control system could determine flow rate by dividing the amount of fuel dispensed in the ROI by the duration in the ROI instead of using the slope of the best-fit line to determine the flow rate. The volume of fuel dispensed in the ROI is the change in fuel level as indicated by the difference in the fuel level between the first point among the tank level data points in the ROI and the last point among the tank level data points in the ROI. The duration in the ROI is the time between the first point in the tank level data points in the ROI and the last point in the tank level data points in the ROI.

There are different techniques to calculate a best fit line for the original tank level data points in the ROI that may be used by the present invention to determine a best fit and therefore a more accurate flow rate of the dispensing point 32. In one embodiment, the control system may use a single least squares linear regression method well to determine a best fit line for the tank level data points in the ROI from which to use the slope to determine the calculated dispensing flow rate. The single least squares linear regression technique is known to one of ordinary skill in the art.

Another method of calculating a best fit line for the tank level data points in the ROI is to use a resistant line. The resistant line technique is less susceptible to being affected by outlier tank level data points that may introduce dead time into the slope of the tank 34 volume change line and thereby make more accurate the calculated flow rate amount for the dispensing point 32. An explanation of the resistant line technique can be found in *Exploring Statistics: A Modern Introduction* by Kitchens (1987), *Exploratory Data Analysis* by Velleman and Hoaglin (1981), and the *ABCs of Exploratory Data Analysis*, all of which are hereby incorporated by reference in their entireties.

Figure 8A:
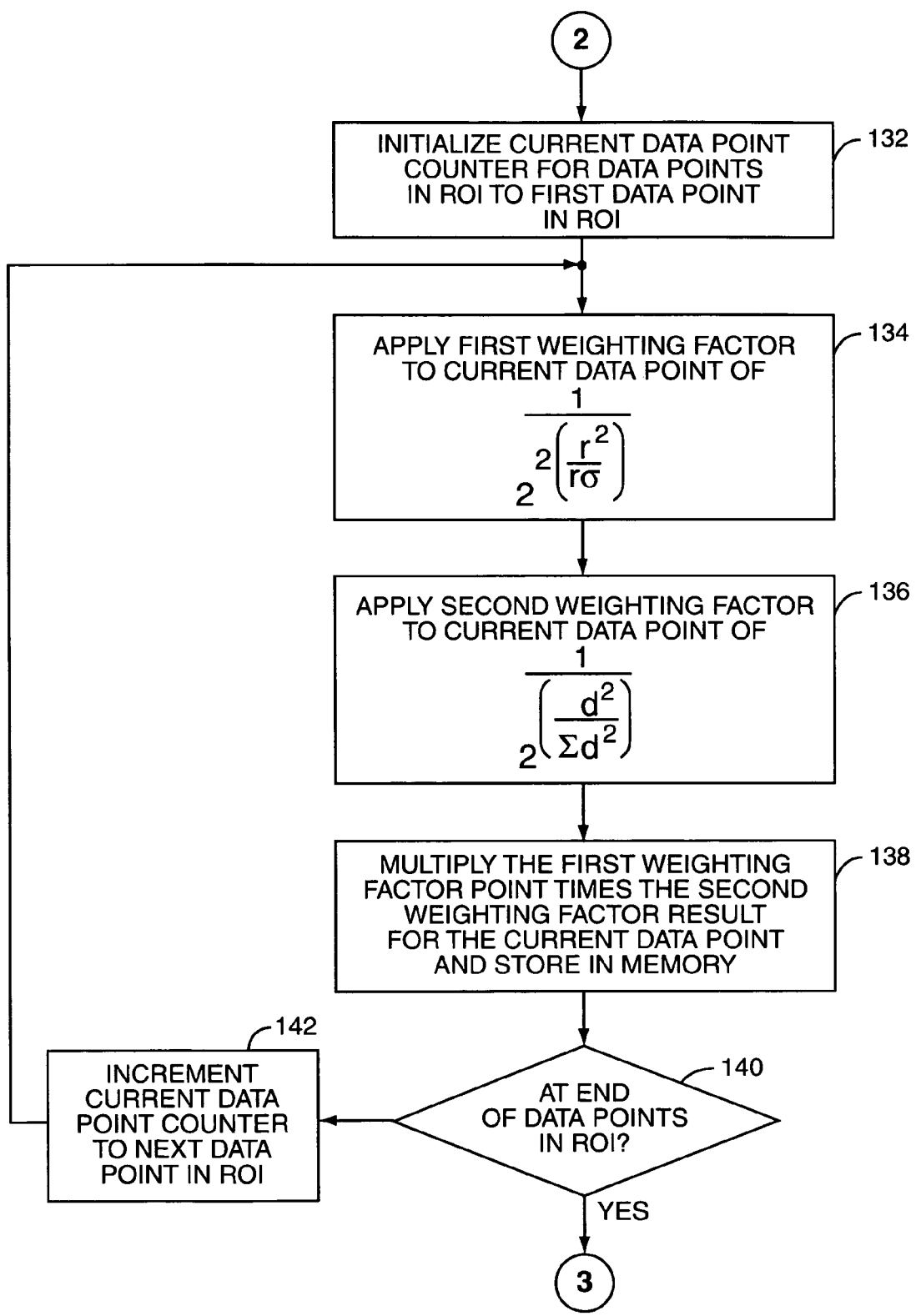
FIGS. 8A and 8B illustrate a flow chart diagram of an alternative embodiment of determining a calculated dispensing flow rate for a dispensing point using a weighted least square regression line technique.
Figure 8B:
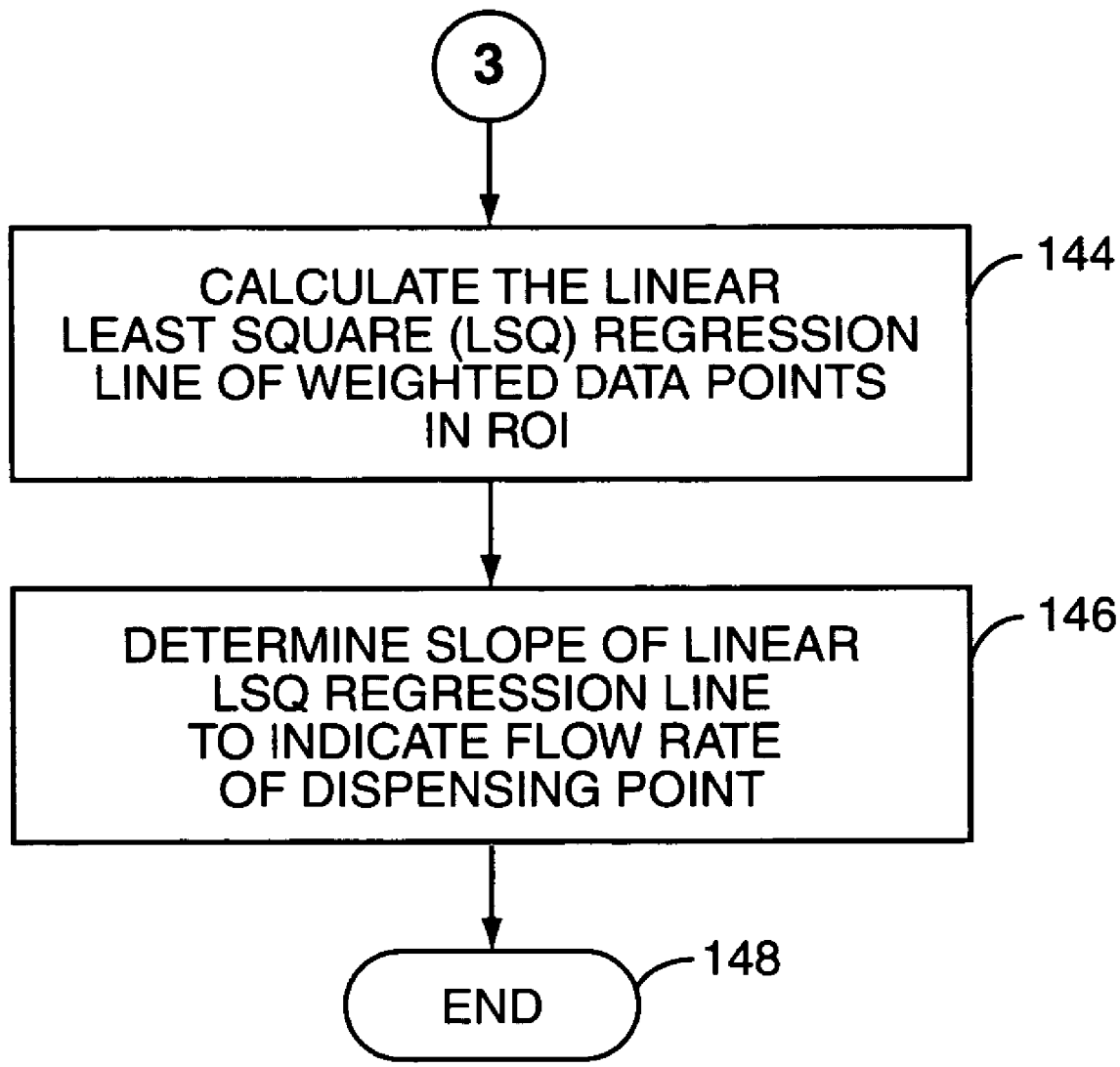

A third method that may be used by the present invention to calculate a best fit line for the tank level data points in the ROI is illustrated in the flow charts in FIGS. 8A and 8B. This technique weights the tank level data points in a manner that reduces the effect of tank level data points farther from the ROI's center of gravity and increases the effect of tank level data points closer to the ROI's center of gravity. Tank level data points that occur farther from the ROI's center of gravity may represent the effects of dead time during dispensing start up and/or top-off irregularities. Lower weights assigned to these points reduce their effect on the calculated slope of the best fit line. Techniques to weight data points is well known to those of ordinary skill in the art.

Turning to FIG. 8A, the process is carried over from FIG. 7B, following a first least squares regression line calculation. The control system initializes a current data point counter for tank level data points in the ROI to the first tank level data point in the ROI (block 132). Next, the control system applies weights to each of the tank level data points in the ROI before calculating a new least squares regression line for the tank level data points. A first weighting factor is applied to the current tank level data point (block 134), which will be first data point during the first iteration of the loop between blocks 134 and 140. The first weighting factor is:

$$\frac{1}{2^{2\left(\frac{r^2}{r\sigma}\right)}}$$

where "r" is the residual error of the point relative to the first least squares regression line; and where "$r_o$" is the standard error of the first least squares regression line.

Next, the control system applies a second weighting factor to the current tank level data point (block 136) according to the formula:

$$\frac{1}{2^{2\left(\frac{d^2}{\Sigma d^2}\right)}}$$

where "d" is the absolute distance in the X-axis from the current tank level data point center of gravity.

The control system next multiples the first weighting factor times the second weighting factor and stores the result in memory as a weight associated with the current tank level data point (block 138). The control system will next determine if all tank level data points in the ROI have weights (decision 140). If not, the current tank level data point counter is incremented (block 142), and the process repeats by returning to block 134 to provide weights for the remaining tank level data points in the ROI. If all tank level data points have weights, the control system calculates a weighted least square linear regression line for the tank level data points in the ROI (block 144 in FIG. 7B) and uses the slope of this line as the calculated dispensing flow rate of the dispensing point 32 for the dispensing event analyzed and the process ends (blocks 146, 148).

Also note that the control system may also perform a filtering function on the tank level data points before a best fit line is calculated for the data points to filter out dead time. Co-pending patent application Ser. No. 10/684,258, filed by the assignee of the present application entitled "Method And System For Determining And Monitoring The Dispensing Efficiency Of A Fuel Dispensing Point In A Service Station Environment," filed on Oct. 11, 2003, which is hereby incorporated herein by reference in its entirety, describes a Hough algorithm filtering technique that may be used by the present invention on the tank level data points before a best fit line is calculated for the tank level data points to determine the calculated dispensing flow rate.

A plurality of calculated dispensing flow rates on an individual dispensing point 32 may be further analyzed as a group to improve the accuracy of the result on a dispensing point 32. A simple arithmetic average or dispensed volume weighted average of a plurality of calculated dispensing flow rates will substantially improve accuracy of the estimated dispensing flow rate. Statistical outlier identification and rejection methods may also be used to improve accuracy. For instance, all rates that exceed 2 or 2.5 or 3 standard deviations beyond the mean may be rejected and a new average calculated using the remainder of flow rates.

Now that the calculated dispensing flow rate of a dispensing point 32 has been calculated, the control system can analyze the calculated dispensing flow rate of a dispensing point 32 to determine if the dispensing point 32 is experiencing a blockage or performance problem since the dead time in such calculation has theoretically been eliminated for all practical purposes. If the control system determines that the calculated dispensing flow rate of the dispensing point 32 is not as expected, the control system can take automated measures on its own to trigger an investigation of the dispensing point 32 so that any problems can be alleviated quickly and without having to wait until a service station operator or service personnel recognizes the problem manually or via customer complaints on slow dispensing point 32 throughput.

Figure 9:
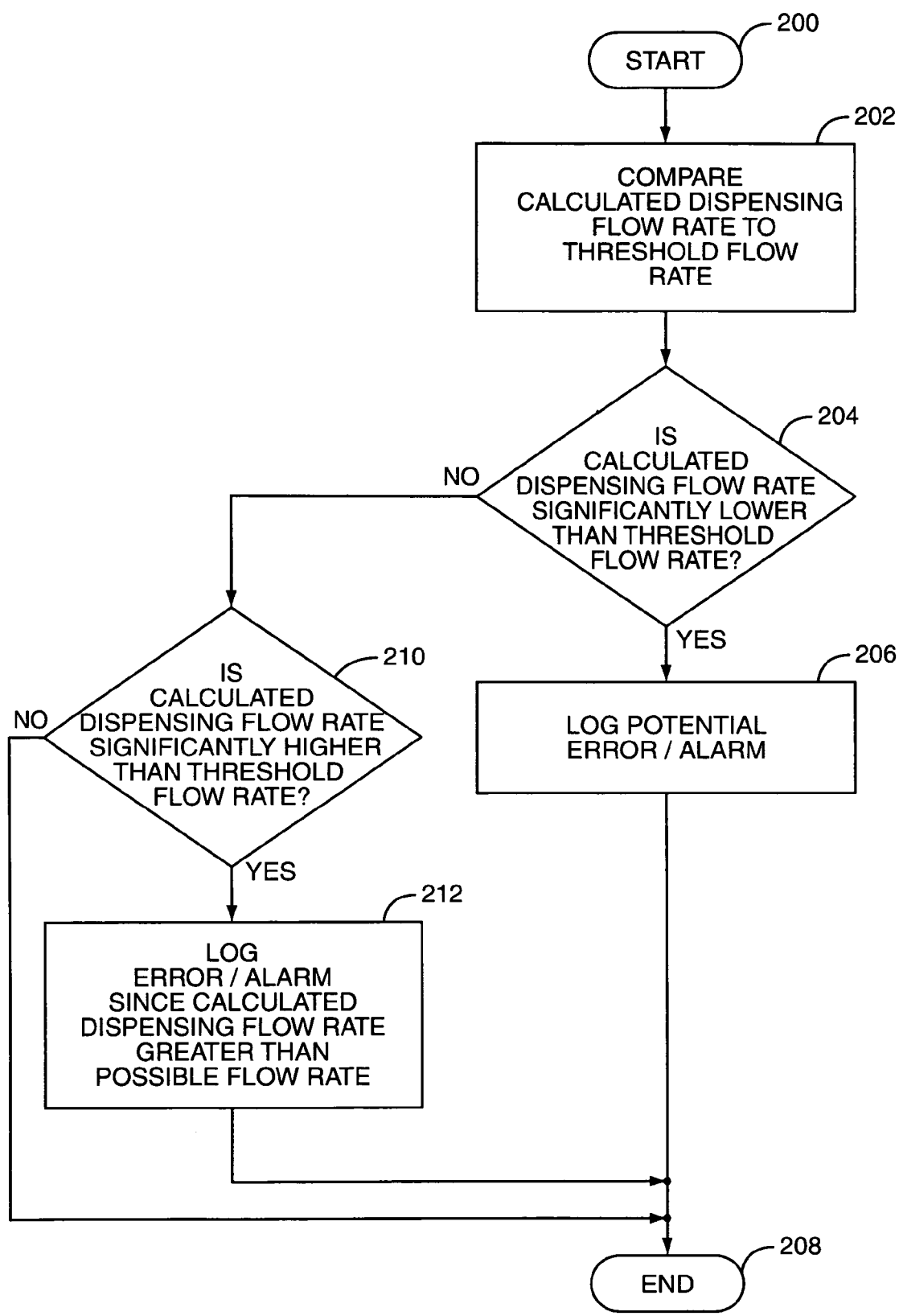
FIG. 9 is a flow chart diagram illustrating one embodiment of analyzing a calculated dispensing flow rate for a dispensing point.

FIG. 9 is a flow chart illustration of a technique whereby the control system can determine if a blockage or performance issues exists with a dispensing point 32 using a calculated dispensing flow rate, and then taking appropriate measures to correct the issue. The process starts (block 200), and the control system compares the previously determined calculated dispensing flow rate for a dispensing point 32 to a threshold flow rate (block 202). The control system next determines if the calculated dispensing flow rate is significantly lower than the threshold flow rate (decision 204). If so, an error is generated, a log of the error is stored in memory, and the control system may generate an alarm to communicate to an operator at the service station 10 and/or to a remote system over the off-site communication link 38 (block 206) where thereafter the process ends (block 208). The definition of "significantly lower" in decision 204 may be any amount of difference between the calculated dispensing flow rate and the threshold flow rate, and may be pre-stored in memory or calculated in real time. Further, the threshold flow rate may be a function of historical calculated dispensing flow rates for the dispensing point 32 being analyzed or other fuel dispensers 32. The goal of decision 204 is to determine if a dispensing point 32 has a blockage or a performance problem for a dispensing event by detecting an abnormality in the calculated dispensing flow rate for such a dispensing point 32.

If the calculated dispensing flow rate for the dispensing point 32 was not significantly lower than the threshold flow rate in decision 204, the control system next determines if the calculated dispensing flow rate is significantly higher than the threshold flow rate (decision 210). The threshold flow rate in this instance is selected such that a positive answer to decision 210 means that the calculated dispensing flow rate calculated is higher than possible and therefore an error condition exists that should be logged and/or reported via an alarm (block 212). If the answer to decision 210 is negative, this means that the calculated dispensing flow rate was not either greater than normal or lower than normal and thus no error or alarm conditions exists—i.e. a blockage or performance problem does not exist.

Figure 10:
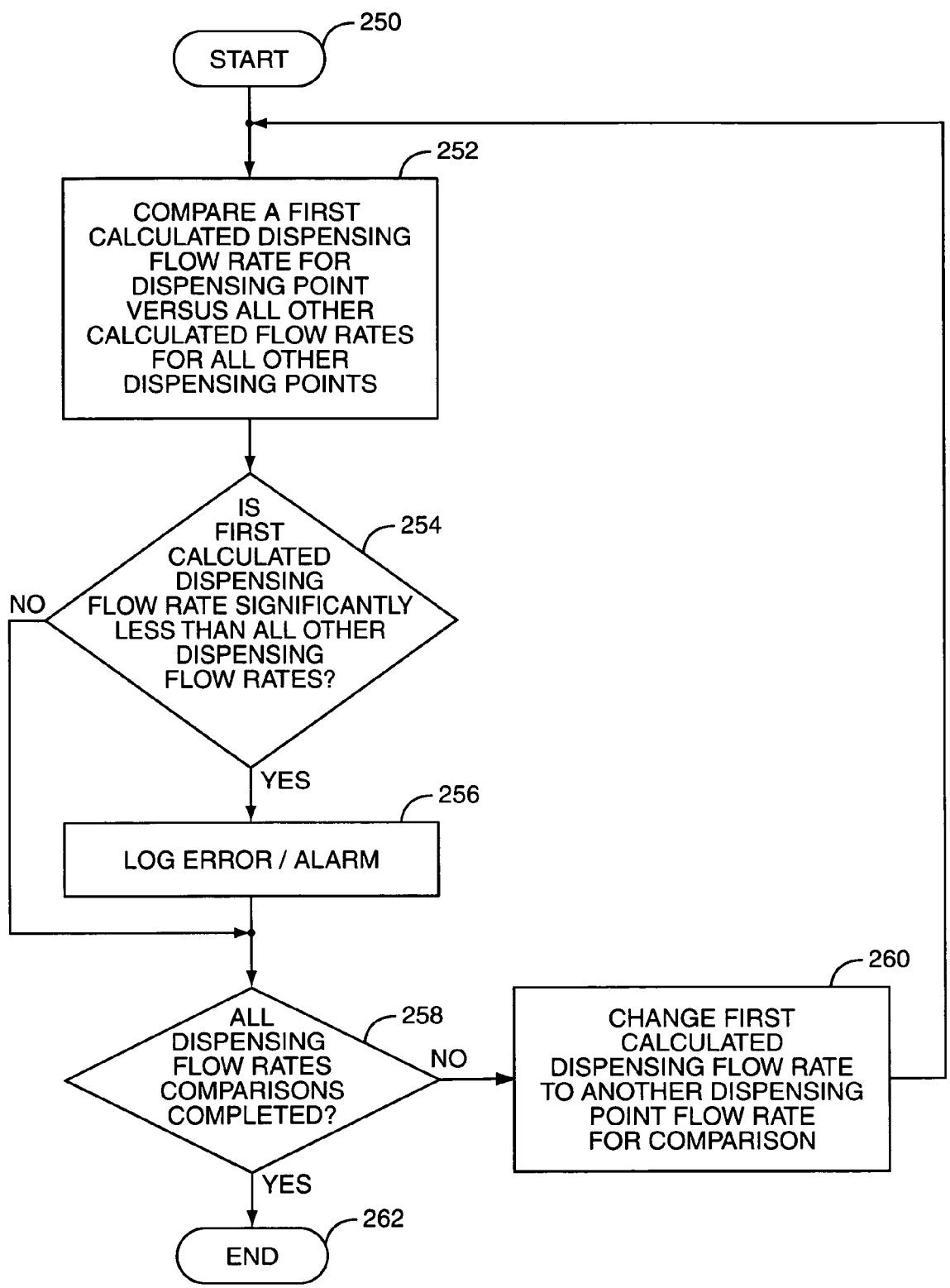
FIG. 10 is a flow chart diagram illustrating an alternative embodiment of analyzing a calculated dispensing flow rate for a dispensing point.

FIG. 10 is a flowchart diagram of an alternative embodiment of the control system analyzing the calculated dispensing flow rate to determine if a blockage and/or performance problem exists at a dispensing point 32. In this embodiment, the process starts (block 250), and then a first calculated dispensing flow rate of a dispensing point 32 is compared against all other calculated dispensing flow rates for all of the other dispensing points 32 (block 252). If the first calculated dispensing flow rate for the dispensing point 32 is significantly less than all other calculated dispensing flow rates for all of the other dispensing points 32 (decision 254), the control system logs an error and/or generates an alarm (block 256) as previously discussed in the flow chart in FIG. 9. If not, the control system makes a determination that the first calculated dispensing flow rate for the dispensing point 32 does not contain a blockage and/or performance problem, since the first calculated dispensing flow rate is higher than at least one other calculated dispensing flow rate for another dispensing point 32. The control system performs the same process in blocks 252–256 until all dispensing points 32 are compared (decision 258 and block 260), in which case the process ends (block 262).

The process in FIG. 10 may not be able to determine a performance issue with a dispensing point 32 if the performance problem exists for all dispensing points 32. For example, if the submersible turbine pump in the underground storage tank 34 is pumping fuel at an abnormally low flow rate, this will generate a lower flow rate at all dispensing points 32 that receive fuel from the underground storage tank 34 with the problematic submersible turbine pump equally.

Figure 11:
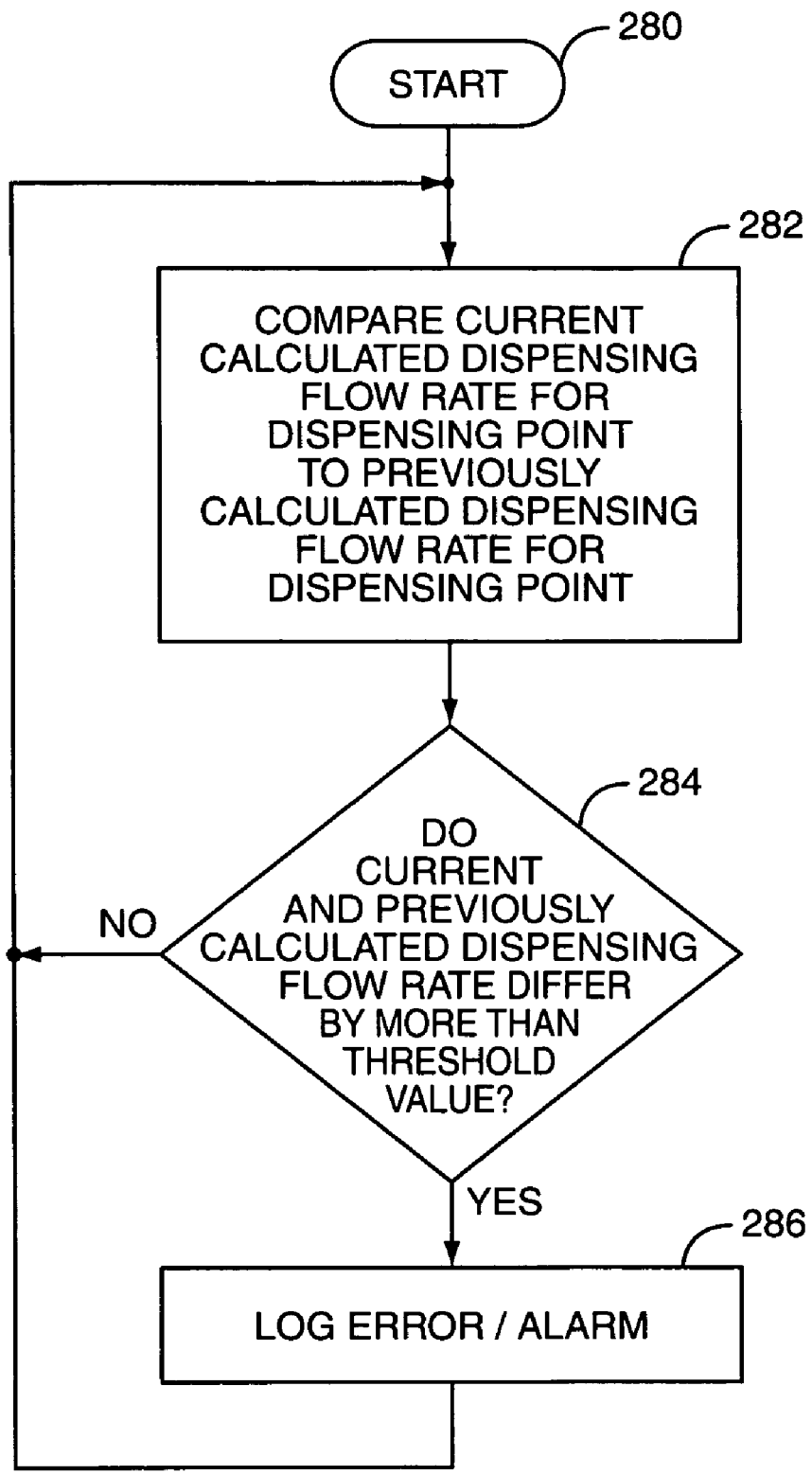
FIG. 11 is a flow chart diagram illustrating another alternative embodiment of analyzing a calculated dispensing flow rate for a dispensing point.

FIG. 11 illustrates a flowchart of yet another embodiment of the control system analyzing the calculated dispensing flow rate to determine if a blockage and/or performance problem exists at a dispensing point 32. In this embodiment, the control system compares a current calculated dispensing flow rate for a dispensing point 32 to a previous calculated dispensing flow rate calculated for the same dispensing point 32 in the past (block 282). The previous calculated dispensing flow rate may be the immediately preceding calculated dispensing flow rate for the dispensing point 32, or may be an average or statistical analysis of a plurality of prior calculated dispensing flow rates for the dispensing point 32. If the calculated dispensing flow rate and the previous calculated dispensing flow rates differ by more than a threshold value (decision 284), the control system logs an error and/or generates an alarm to indicate that the dispensing point 32 has a blockage and/or performance problem, since the calculated dispensing flow rate has changed from what it has historically been (block 286), and the process continues to repeat whether as a result of logging and error and/or alarm (block 286), or if the answer to decision 284 is negative.

The following sections describe treatment of aggregate flow rates of multiple concurrent dispensing events on multiple dispensing points 32. Aggregate flow rates may be analyzed to determine the flow capacity characteristics of each fueling pump in the fueling system under increasing pumping load as described in the following sections. They may also be used to calculate individual dispensing point 32 flow rates using multiple linear regression techniques as described in later sections.

Figure 12:
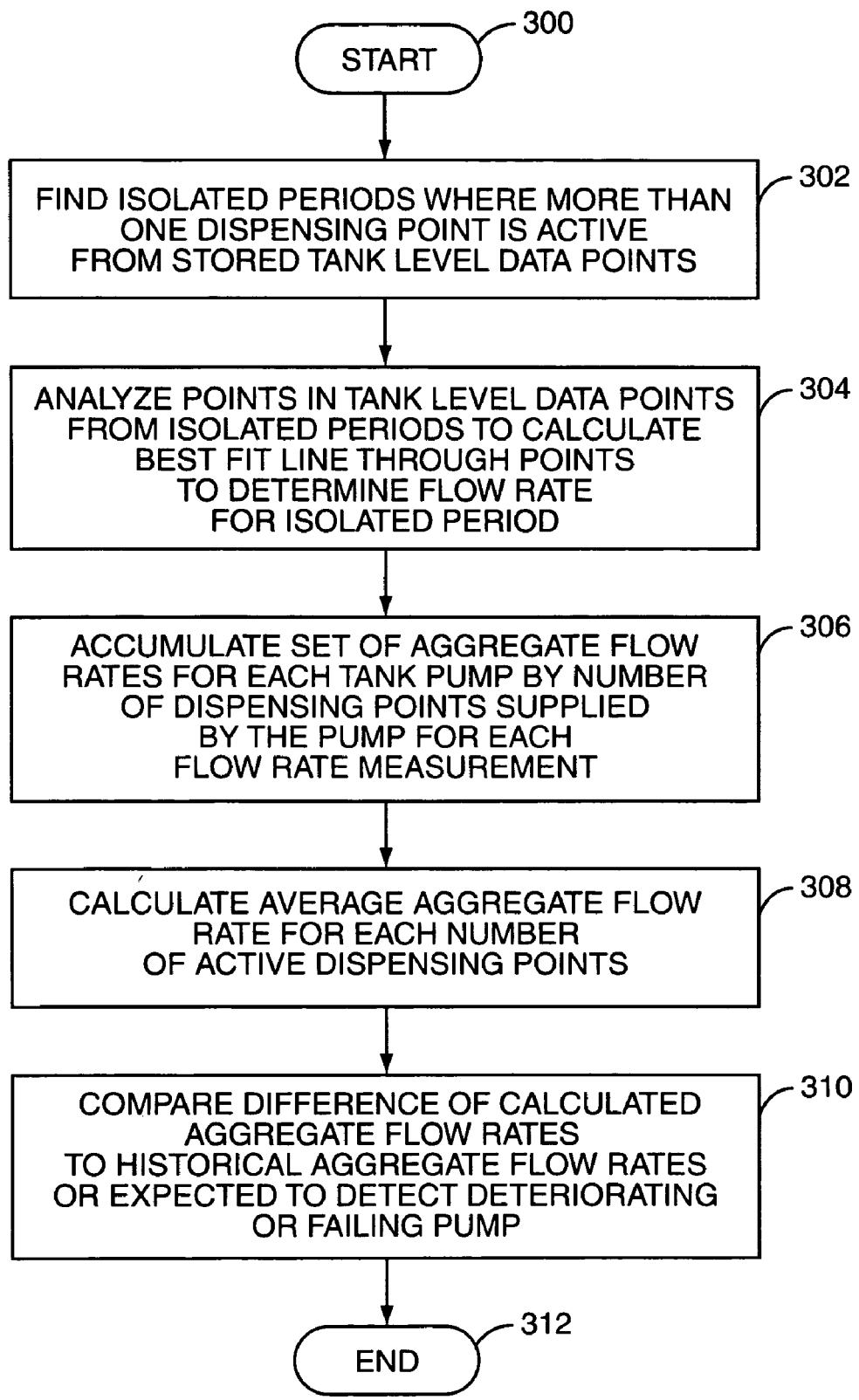
FIG. 12 is a flow chart diagram illustrating an analysis of aggregate flow rates of multiple concurrent dispensing events on multiple dispensing points to determine if the fuel tank pump has a performance problem or malfunction.

Turning to the flow chart illustrated in FIG. 12, dispensing event periods consisting of multiple concurrent dispensing events on multiple dispensing points are first identified in the stored data by examining the chronological sequence of dispense start and end times for all dispensing points 32 at a dispensing facility. The process starts (block 300), and periods where more than one dispensing point 32 is active are isolated and tank fuel level data points are found between the start and end of each isolated period (block 302).

Each period of tank level data points is analyzed using any one or more of the methods described above for single active dispensing point 32 dispensing events to calculate a best fit line to the highest slope portion of the period data points (block 304). The slope of the best fit line is an aggregate flow rate for the combined dispensing activity on the multiple active dispensing points. A set of calculated aggregate flow rates may be accumulated and analyzed in the following two described ways.

First, a set of aggregate flow rates are accumulated and grouped for each active pump by number of active dispensing points 32 supplied by that pump (block 306). Periods where more than one pump is active are rejected from this analysis. For example, all periods where two dispensing points are active with one active pump form a 2-dispensing point group for that pump, all periods where three dispensing points are active with one active pump form a 3-dispensing point period group, etc., including up to the maximum number of active dispensing points periods found for that pump. These groupings are used along with the group of single active dispensing point rates for that pump from the above described analyses for singly active dispensing point dispensing event periods.

An average aggregate flow rate is calculated from the individual rates for each dispensing point grouping on a pump using for example a dispensed volume weighted averaging method or other statistical means to improve resulting accuracy (block 308). It is expected that the 2-dispensing point grouping aggregate flow rate is approximately double the 1-dispensing point grouping flow rate and the 3-dispensing point grouping aggregate flow rate is approximately 3 times the 1-dispensing flow rate, etc.

Since a pump exhibits a limited flow capacity, as the number of concurrently supplied dispensing points increases, the aggregate flow rate amounts will tend to fall off from a strictly linearly increasing relationship with the number of dispensing points. For instance, for a 50 GPM pump, and for dispensing pints having 10 GPM flow rates when supplied singly by the pump, the aggregate flow rate will typically begin to fall off from strictly linear with the number of active points when 4- or 5-dispensing points are concurrently active for that pump. Aggregate flow rates for a properly working pump might be, for example, as shown in the following table.

| Active Dispensing Points | Aggregate Flow Rate | Linear GPM |
| --- | --- | --- |
| 1 | 10 | 10 |
| 2 | 20 | 20 |
| 3 | 29 | 30 |
| 4 | 38 | 40 |
| 5 | 46 | 50 |
| 6 | 52 | 60 |

An aggregate flow rate sequence that falls off from linear with the number of dispensing points earlier than expected or more so than compared to historical aggregate flow rate performance is an indication of a clogged, deteriorating or falling pump (block 310). The techniques described in FIG. 9 may be used to detect a deteriorating or failing pump where the "calculated dispensing flow rate" would be the "aggregate flow rate sequence" and the "threshold flow rate" would be the "historical aggregate flow rate performance."

In another embodiment of using aggregate flow rates to analyze the performance of a pump, a set of aggregate flow rates of multiple concurrent dispensing event periods on multiple dispensing points may be combined with singly active dispensing point dispensing event periods, as described above. The combinded flow rates may be further analyzed to improve the accuracy of the estimated flow rate on a dispensing point or to reduce the time required to accumulate adequate data for an analysis on a dispensing point.

For example, each single or multiple concurrent active dispensing point dispensing peroid may be categorized by the dispensing point number or numbers that are active during a period being analyzed. The aggregate flow rate and associated dispensing point numbers for a period form one data point. A set of such data points is analyzed using multiple linear regression to calculate a flow rate for each individual DP found in the data set. See U.S. Pat. No. 6,622,757 "Fueling System Vapor Recovery and Containment Performance Monitor and Method of Operation Thereof", column 9 lines 48–67 and column 10 lines 1–34 for a description of the method, which is hereby incorporated by reference herein in its entirety. Substitute aggregate flow rate for $A_n$, a 0 (dispensing point not active) or 1 (dispensing active) for $L_{nm}$, and individual dispensing point rate result (the calculated result of the multiple linear regression calculation) for $R_m$, where subscript 'n' denotes data set data point number and subscript 'm' denotes the dispensing point number. The calculation yields individual dispensing flow rate, $R_m$, for each dispensing point represented in the data set.

Those skilled in the art will recognize improvements and modifications to the preferred embodiments of the present invention. The term connected in an electronic communication context encompasses either a wired or wireless connection. The term connected may be used interchangeably with coupled. All such improvements and modifications are considered within the scope of the concepts disclosed herein.

We claim:

1. A method of determining the flow rate of a single dispensing point for a dispensing transaction in a service station using dispensing point dispensing start and end event data and tank probe fuel level data from a fuel tank which supplies fuel to the single dispensing point, comprising the steps of:

(a) receiving tank level data that is a record of the tank level of the fuel tank that supplies fuel to the dispensing point to formulate a plurality of tank level data points;

(b) determining the start of the dispensing transaction using a dispensing start event for the dispensing point;

(c) determining the end of the dispensing transaction using a dispensing end event for the dispensing point;

(d) defining a region of interest in the plurality of tank level data points between the start of the dispensing transaction and the end of the dispensing transaction;

(e) determining the amount of fuel dispensed by the dispensing point in the region of interest;

(f) calculating the flow rate of the dispensing point for the dispensing transaction based on the amount of fuel dispensed by the dispensing point in the region of interest and the duration in the region of interest; and (g) storing the calculated dispensing flow rate.

2. The method of claim 1, wherein step (b) of determining the start of the dispensing transaction comprises determining a first point in the plurality of tank level data points indicative of when fueling at the dispensing point began.

3. The method of claim 2, wherein step (c) of determining the end of the dispensing transaction comprises determining a last point in the plurality of tank level data points indicative of when fueling at the dispensing point ended.

4. The method of claim 3, wherein step (e) comprises:
   (i) fitting a line through the plurality of tank level data points in the region of interest;
   (ii) determining the slope of the line;
   (iii) using the slope of the line as the calculated dispensing flow rate of the dispensing point; and
   (iv) storing the calculated dispensing flow rate in memory of a control system.

5. The method of claim 4, further comprising filtering the tank level data points in the region of interest to eliminate outlying tank level data points in the region of interest before performing steps (i)–(iii).

6. The method of claim 4, wherein the step (i) of fitting a line comprises calculating a best fit line through the plurality of tank level data points in the region of interest.

7. The method of claim 6, wherein the best fit line is calculated using a technique from the group consisting of a least squares linear regression technique, and a resistant line technique.

8. The method of claim 6, further comprising weighting the tank level data points in the region of interest before performing steps (i)–(iii).

9. The method of claim 8, wherein the tank level data points in the region of interest farther from the center of gravity of the tank level data points in the region of interest are weighted lower than the tank level data points in the region of interest closer to the center of gravity of the tank level data points in the region of interest.

10. The method of claim 9 wherein step (ii) of determining the slope of the line is comprised of:
    weighting the tank level data points in the region of interest using their associated weighting factors; and
    fitting a line through the weighted tank level data points in the region of interest.

11. The method of claim 8, wherein the step of weighting comprises:
    fitting a preliminary line through the tank level data points; and
    for all tank level data points in the region of interest:
        applying a weighting factor to a current tank level data point from the plurality of tank level data points in the region of interest based on the residual of the current tank level data point to the preliminary line; and
        storing the weighting factor result in memory associated with the current tank level data point.

12. The method of claim 11, wherein the step of applying a weighting factor to a current tank level data point comprises:
    applying a first weighting factor to a current tank level data point from the plurality of tank level data points in the region of interest based on the residual of the current tank level data point to the preliminary line according to the formula:

$$\frac{1}{2\left(\frac{r^2}{r\sigma}\right)};$$

applying a second weighting factor to the current tank level data point according to the formula:

$$\frac{1}{2\left(\frac{d^2}{\Sigma d^2}\right)}; \text{ and}$$

multiplying the first weighting factor times the second weighting factor to calculate a weighting factor result.

13. The method of claim 3, wherein the step of determining the last point comprises determining from the plurality of tank level data points after the first point where the slope begins to decrease to less than a slope threshold value.

14. The method of claim 13 wherein the last point is a point in the plurality of tank level data points that is one point before the last point.

15. The method of claim 14, wherein step (f) comprises dividing the amount of fuel dispensed by the dispensing point in the region of interest by the duration in the region of interest.

16. The method of claim 13, wherein step (f) comprises dividing the amount of fuel dispensed by the dispensing point in the region of interest by the duration in the region of interest.

17. The method of claim 3, further comprising smoothing the tank level data points in determining the first point and the last point.

18. The method of claim 2, wherein the step of determining the first point comprises determining from the plurality of tank level data points where the slope begins to increase to greater than a slope threshold value.

19. The method of claim 18, wherein step (f) comprises dividing the amount of fuel dispensed by the dispensing point in the region of interest by the duration in the region of interest.

20. The method of claim 1, further comprising determining if the calculated dispensing flow rate is different than an expected value.

21. The method of claim 20, wherein the step of determining if the calculated dispensing flow rate is different than an expected value comprises determining if the calculated dispensing flow rate is significantly lower than a threshold value.

22. The method of claim 20, wherein the step of determining if the calculated dispensing flow rate is different than an expected value comprises determining if the calculated dispensing flow rate is significantly higher than the threshold value.

23. The method of claim 20, further comprising reporting a problem if the calculated dispensing flow rate is different than the expected value.

24. The method of claim 20, further comprising generating an alarm if the calculated dispensing flow rate is different than the expected value.

25. The method of claim 1, further comprising:
    comparing the calculated dispensing flow rate to other previously calculated dispensing flow rates for other dispensing points; and
    determining if the calculated dispensing flow rate is less than the other previously calculated dispensing flow rates for other dispensing points.

26. The method of claim 25, further comprising reporting a problem if the calculated dispensing flow rate is less than the other previously calculated dispensing flow rates for other dispensing points.

27. The method of claim 25, further comprising generating an alarm if the calculated dispensing flow rate is less than the other previously calculated dispensing flow rates for other dispensing points.

28. The method of claim 1, further comprising:
comparing the calculated dispensing flow rate to other previously calculated dispensing flow rates for the dispensing point; and
determining if the calculated dispensing flow rate is different than the other previously calculated dispensing flow rates for the dispensing point.

29. The method of claim 28, further comprising reporting a problem if the calculated dispensing flow rate is different than the other previously calculated dispensing flow rates for the dispensing point.

30. The method of claim 28, further comprising generating an alarm if the calculated dispensing flow rate is different than the other previously calculated dispensing flow rates for the dispensing point.

31. The method of claim 1, wherein step (f) comprises dividing the amount of fuel dispensed by the dispensing point in the region of interest by the duration in the region of interest.

32. A system for determining the flow rate of a single dispensing point for a dispensing transaction in a service station using dispensing point dispensing start and end event data and tank probe fuel level data from a fuel tank which supplies fuel to the single dispensing point, comprising:
a tank that contains fuel;
a probe electronically coupled to a control system having memory wherein the probe determines the tank level of the tank and communicates the tank level to a control system;
a fuel dispenser, comprising:
a dispensing point;
a controller coupled to the dispensing point wherein the controller:
controls fueling through said dispensing point;
generates a dispensing start event when fueling is allowed to be dispensed through the dispensing point; and
generates a dispensing end event when fueling is no longer allowed to be dispensed through said dispensing point;
said control system adapted to:
(a) receive tank level data that is a record of the tank level of the fuel tank that supplies fuel to the dispensing point to formulate a plurality of tank level data points;
(b) determine the start of the dispensing transaction using a dispensing start event for the dispensing point;
(c) determine the end of the dispensing transaction using a dispensing end event for the dispensing point;
(d) define a region of interest in the plurality of tank level data points between the start of the dispensing transaction and the end of the dispensing transaction;
(e) determine the amount of fuel dispensed by the dispensing point in the region of interest; and
(f) calculate the flow rate of the dispensing point for the dispensing transaction based on the amount of fuel dispensed by the dispensing point in the region of interest and the duration in the region of interest.

33. The system of claim 32, wherein the control system is further adapted to determine the start of the dispensing transaction by determining a first point in the plurality of tank level data indicative of when fueling at the dispensing point began.

34. The system of claim 33, wherein the control system is further adapted to determine the end of the dispensing transaction by determining a last point in the plurality of tank level data points indicative of when fueling at the dispensing point ended.

35. The system of claim 34, wherein the control system is adapted to calculate the flow rate of the dispensing point for the dispensing transaction by:
(i) fitting a line through the plurality of tank level data points in the region of interest;
(ii) determining the slope of the line;
(iii) using the slope of the line as the calculated dispensing flow rate of the dispensing point; and
(iv) storing the calculated dispensing flow rate in memory of a control system.

36. The system of claim 35, wherein the control system is further adapted to filter the tank level data points in the region of interest to eliminate outlying tank level data points in the region of interest.

37. The system of claim 35, wherein the control system is further adapted to fit a line through the plurality of tank level data points in the region of interest by calculating a best fit line through the plurality of tank level data points in the region of interest.

38. The system of claim 37, wherein the control system is further adapted to calculate the best fit line using a technique from the group consisting of a least squares linear regression technique, and a resistant line technique.

39. The system of claim 37, wherein the control system is further adapted to weight the tank level data points in the region of interest.

40. The system of claim 39, wherein the control system is further adapted to weight lower the tank level data points in the region of interest farther from the center of gravity of the tank level data points in the region of interest than the tank level data points in the region of interest closer to the center of gravity of the tank level data points in the region of interest.

41. The system of claim 40, wherein the control system is further adapted to: fit a
preliminary line through the tank level data points; and
for all tank level data points in the region of interest:
apply a weighting factor to a current tank level data point from the plurality of tank level data points in the region of interest based on the residual of the current tank level data point to the preliminary line; and
store the weighting factor result in memory associated with the current tank level data point.

42. The system of claim 41, wherein the control system is further adapted to:
apply a first weighting factor to a current tank level data point from the plurality of tank level data points in the region of interest based on the residual of the current tank level data point to the preliminary line according to the formula:

$$\frac{1}{2^{2\left(\frac{r^2}{r\sigma}\right)}};$$

apply a second weighting factor to the current tank level data point according to the formula:

$$\frac{1}{2\left(\frac{d^2}{\Sigma d^2}\right)}; \text{ and}$$

multiply the first weighting factor times the second weighting factor to calculate a weighting factor result.

43. The system of claim 40, wherein the control system is further adapted to:
weight the tank level data points in the region of interest using their associated weighting factors; and
fit a line through the weighted tank level data points in the region of interest.

44. The system of claim 33, wherein the control system determines the first point by determining from the plurality of tank level data points where the slope begins to increase to greater than a slope threshold value.

45. The system of claim 44 wherein the control system determines the last point by determining from the plurality of tank level data points after the first point where the slope begins to decrease to less than a slope threshold value.

46. The system of claim 45 wherein the last point is a point in the plurality of tank level data points that is one point before the last point.

47. The system of claim 46, wherein the control system is adapted to calculate the flow rate of the dispensing point for the dispensing transaction based on the amount of fuel dispensed by the dispensing point in the region of interest and the duration in the region of interest by dividing the amount of fuel dispensed by the dispensing point in the region of interest by the duration in the region of interest.

48. The system of claim 45, wherein the control system is further adapted to smooth the tank level data points in determining the first point and the last point.

49. The system of claim 45, wherein the control system is adapted to calculate the flow rate of the dispensing point for the dispensing transaction based on the amount of fuel dispensed by the dispensing point in the region of interest and the duration in the region of interest by dividing the amount of fuel dispensed by the dispensing point in the region of interest by the duration in the region of interest.

50. The system of claim 44, wherein the control system is adapted to calculate the flow rate of the dispensing point for the dispensing transaction based on the amount of fuel dispensed by the dispensing point in the region of interest and the duration in the region of interest by dividing the amount of fuel dispensed by the dispensing point in the region of interest by the duration in the region of interest.

51. The system of claim 32, wherein the control system is further adapted to determine if the calculated dispensing flow rate is different than an expected value.

52. The system of claim 51, wherein the control system is further adapted to determine if the calculated dispensing flow rate is significantly lower than a threshold value.

53. The system of claim 51, wherein the control system is further adapted to determine if the calculated dispensing flow rate is significantly higher than the threshold value.

54. The system of claim 51, wherein the control system is further adapted to report a problem if the calculated dispensing flow rate is different than the expected value.

55. The system of claim 51, wherein the control system is further adapted to generate an alarm if the calculated dispensing flow rate is different than the expected value.

56. The system of claim 32, wherein the control system is further adapted to:
compare the calculated dispensing flow rate to other previously calculated dispensing flow rates for other dispensing points; and
determine if the calculated dispensing flow rate is less than the other previously calculated dispensing flow rates for other dispensing points.

57. The system of claim 56, wherein the control system is further adapted to report a problem if the calculated dispensing flow rate is less than other previously calculated dispensing flow rates for other dispensing points.

58. The system of claim 56, wherein the control system is further adapted to generate an alarm if the calculated dispensing flow rate is less than other previously calculated dispensing flow rates for other dispensing points.

59. The system of claim 32, wherein the control system is further adapted to:
compare the calculated dispensing flow rate to other previously calculated dispensing flow rates for the dispensing point; and
determine if the calculated dispensing flow rate is different than the other previously calculated dispensing flow rates for the dispensing point.

60. The system of claim 59, wherein the control system is further adapted to report a problem if the calculated dispensing flow rate is different than the previously calculated dispensing flow rates for the dispensing point.

61. The system of claim 59 wherein the control system is further adapted to generate an alarm if the calculated dispensing flow rate is different than the other previously calculated dispensing flow rates for the dispensing point.

62. The system of claim 32, wherein the control system is adapted to calculate the flow rate of the dispensing point for the dispensing transaction based on the amount of fuel dispensed by the dispensing point in the region of interest and the duration in the region of interest by dividing the amount of fuel dispensed by the dispensing point in the region of interest by the duration in the region of interest.

63. A method of determining the capacity of a pump and/or the flow rate of a dispensing point for a dispensing transaction in a service station using dispensing point dispensing start and end event data and tank probe data from a tank for multiple concurrent dispensing transactions, comprising the steps of:
(I) receiving tank level data that is a record of the tank level of the fuel tank that supplies fuel to a plurality of dispensing points using the pump to formulate a plurality of tank level data points;
(II) receiving the start of dispensing transactions using dispensing start events for the plurality of dispensing points;
(III) receiving the end of dispensing transactions using dispensing end events for the plurality of dispensing points; and
(IV) determining periods in the plurality of tank level data points where more than one dispensing point is active; and
for each of the periods:
(a) determining the number of dispensing points that are active in the plurality of tank level data points;
(b) determining the start of the dispensing transactions using dispensing start events for the dispensing points;
(c) determining the end of the dispensing transactions using dispensing end events for the dispensing points;

(d) defining a region of interest in the plurality of tank level data points between the start of the dispensing transactions and the end of the dispensing transactions;

(e) determining the amount of fuel dispensed by the plurality of dispensing points in the region of interest;

(f) calculating an aggregate dispensing flow rate of the dispensing points based on the amount of fuel dispensed by the plurality of dispensing points in the region of interest and the duration in the region of interest; and (g) storing the calculated dispensing flow rate.

64. The method of claim 63, further comprising calculating average aggregate flow rates for each number of dispensing points that are active using the calculated aggregate flow rates associated with the number of dispensing points that are active to detect a deteriorating or failing pump.

65. The method of claim 64, further comprising comparing the difference of the average aggregate flow rates to corresponding aggregate average flow rates for the same number of dispensing points that are active to detect a deteriorating or failing pump.

66. The method of claim 64, further comprising comparing the difference of the average aggregate flow rates to expected aggregate average flow rates for the same number of dispensing points that are active to detect a deteriorating or failing pump.

67. The method of claim 64, further comprising reporting the deteriorating or failing pump.

68. The method of claim 64, further comprising generating an alarm of the deteriorating or failing pump.

69. The method of claim 63, further comprising calculating individual flow rates for each of the plurality of dispensing points using the aggregate flow rates by:

forming a generalized equation for the relationship of the aggregate flow rates, to the active dispensing points contained in the aggregate flow rates and the flow rates of individual dispensing points from the plurality of dispensing points; and solving the generalized equation for each of the individual dispensing points in each of the plurality of fuel dispensing points.

70. The method of claim 63, wherein step (b) of determining the start of the dispensing transactions comprises determining a first point in the plurality of tank level data points indicative of when fueling at the plurality of dispensing points began.

71. The method of claim 70, wherein step (c) of determining the end of the dispensing transactions comprises determining a last point in the plurality of tank level data points indicative of when fueling at the plurality of dispensing points ended.

72. The method of claim 71, wherein step (e) comprises:

(i) fitting a line through the plurality of tank level data points in the region of interest;

(ii) determining the slope of the line;

(iii) using the slope of the line as the calculated aggregate dispensing flow rate of the plurality of dispensing points; and (iv) storing the calculated aggregate dispensing flow rate in memory of a control system.

73. A system for determining the capacity of a pump and/or the flow rate of a dispensing point for a dispensing transaction in a service station using dispensing point dispensing start and end event data and tank probe data from a tank from multiple concurrent dispensing transactions, comprising:

a probe electronically coupled to a control system having memory wherein the probe determines the tank level of the tank and communicates the tank level to the control system;

said control system adapted to:

(I) receive tank level data that is a record of the tank level of the fuel tank that supplies fuel to a plurality of dispensing points using the pump to formulate a plurality of tank level data points;

(II) receive the start of dispensing transactions using dispensing start events for the plurality of dispensing points;

(III) receive the end of dispensing transactions using dispensing end events for the plurality of dispensing points; and (IV) determine periods in the plurality of tank level data points where more than one dispensing point is active; and for each of the periods:

(a) determine the number of dispensing points that are active in the plurality of tank level data points;

(b) determine the start of the dispensing transactions using dispensing start events for the dispensing points;

(c) determine the end of the dispensing transactions using dispensing end events for the dispensing points;

(d) define a region of interest in the plurality of tank level data points between the start of the dispensing transactions and the end of the dispensing transactions;

(e) determine the amount of fuel dispensed by the plurality of dispensing points in the region of interest; and (f) calculate an aggregate dispensing flow rate of the dispensing points based on the amount of fuel dispensed by the plurality of dispensing points in the region of interest and the duration in the region of interest.

74. The system of claim 73, wherein the control system is further adapted to calculate average aggregate flow rates for each number of dispensing points that are active using the calculated aggregate flow rates associated with the number of dispensing points that are active to detect a deteriorating or failing pump.

75. The system of claim 74, wherein the control system is further adapted to compare the difference of the average aggregate flow rates to corresponding aggregate average flow rates for the same number of dispensing points that are active to detect a deteriorating or failing pump.

76. The system of claim 74, wherein the control system is further adapted to compare the difference of the average aggregate flow rates to expected aggregate average flow rates for the same number of dispensing points that are active to detect a deteriorating or failing pump.

77. The system of claim 74, wherein the control system is further adapted to report the deteriorating or failing pump.

78. The system of claim 74, wherein the control system is further adapted to generate an alarm of the deteriorating or failing pump.

79. The system of claim 73, wherein the control system is further adapted to calculate individual flow rates for each of the plurality of dispensing points using the aggregate flow rates wherein the control system is further adapted to:

form a generalized equation for the relationship of the aggregate flow rates, to the active dispensing points contained in the aggregate flow rates and the flow rates of individual dispensing points from the plurality of dispensing points; and solve the generalized equation for each of the individual dispensing points in each of the plurality of fuel dispensing points.

80. The system of claim 73, wherein the control system is further adapted to determine the start of the dispensing transactions by determining a first point in the plurality of tank level data points indicative of when fueling at the plurality of dispensing points began.

81. The system of claim 80, wherein the control system is further adapted to determine the end of the dispensing transactions by determining a last point in the plurality of tank level data points indicative of when fueling at the plurality of dispensing points ended.

82. The system of claim 81, wherein the control system is further adapted to:
(i) fit a line through the plurality of tank level data points in the region of interest;
(ii) determine the slope of the line;
(iii) use the slope of the line as the calculated aggregate dispensing flow rate of the plurality of dispensing points; and
(iv) store the calculated aggregate dispensing flow rate in memory of a control system.

* * * * *